United States Patent
Kamila et al.

(10) Patent No.: US 11,686,330 B2
(45) Date of Patent: Jun. 27, 2023

(54) MANUFACTURE AND PROCESS FOR INHIBITING WEAR IN A LATCH SYSTEM

(71) Applicant: The Boeing Company, Chicago, IL (US)

(72) Inventors: Eric S. Kamila, Seattle, WA (US); Charles E. Jokisch, Seattle, WA (US); Renato S. Felicio, Seattle, WA (US)

(73) Assignee: The Boeing Company, Arlington, VA (US)

( * ) Notice: Subject to any disclaimer, the term of this patent is extended or adjusted under 35 U.S.C. 154(b) by 1213 days.

(21) Appl. No.: 16/137,333

(22) Filed: Sep. 20, 2018

(65) Prior Publication Data

US 2020/0096105 A1    Mar. 26, 2020

(51) Int. Cl.

| F15B 15/14 | (2006.01) |
|---|---|
| F16C 11/10 | (2006.01) |
| F16C 11/04 | (2006.01) |
| F16B 1/00 | (2006.01) |
| B64C 3/56 | (2006.01) |

(52) U.S. Cl.
CPC ...... *F15B 15/1461* (2013.01); *F15B 15/1428* (2013.01); *F15B 15/1471* (2013.01); *F16B 1/005* (2013.01); *F16C 11/045* (2013.01); *F16C 11/10* (2013.01); *B23P 2700/01* (2013.01); *B64C 3/56* (2013.01); *F16C 2326/43* (2013.01); *Y10T 403/32861* (2015.01)

(58) Field of Classification Search
CPC .............. F16C 11/045; F15B 15/1471; F15B 15/1461; B23P 2700/01; B64C 3/56; F16B 1/005
See application file for complete search history.

(56) References Cited

U.S. PATENT DOCUMENTS

| 5,201,479 A | 4/1993 | Renzelmann |
| 5,350,135 A | 9/1994 | Renzelmann et al. |
| 5,381,986 A * | 1/1995 | Smith ................. B64C 3/56 |
| | | 244/49 |
| 5,452,643 A | 9/1995 | Smith et al. |

(Continued)

OTHER PUBLICATIONS

European Office Action dated Oct. 12, 2021 regarding EP Application No. 19197376.7; 5 pages.

(Continued)

*Primary Examiner* — Abiy Teka
*Assistant Examiner* — Daniel S Collins
(74) *Attorney, Agent, or Firm* — Yee & Associates, P.C.

(57) ABSTRACT

A manufacture configured to and process for inhibiting, from wear, a lock in a latching system comprising: a gland surrounding an actuator translating the lock through: a first fixed lock receptor and a moveable lock receptor. The manufacture and process include: inhibiting a skewing, of a lock central axis of the lock with the lock translating through the first opening and the opening in the moveable lock receptor, away from substantially aligning with: a first central axis of a first opening of the first fixed lock receptor, and an actuator central axis of the actuator, via fitting a first translation guide into the first fixed lock receptor. Also included is inhibiting: wear of a gland around an actuator in the lock while translating, and leaking, past the gland, of an actuator fluid within the lock; and skewing of an actuator central axis of the actuator.

21 Claims, 14 Drawing Sheets

(56) References Cited

U.S. PATENT DOCUMENTS

| | | | |
|---|---|---|---|
| 9,140,302 B2* | 9/2015 | Kane | .......................... C22C 9/06 |
| 9,914,524 B2* | 3/2018 | Good | .......................... B64C 3/56 |
| 2006/0169132 A1 | 8/2006 | Tucker | |
| 2014/0182722 A1 | 7/2014 | Hattori et al. | |
| 2015/0014478 A1* | 1/2015 | Lassen | ..................... B64C 3/56 |
| | | | 244/49 |
| 2018/0148159 A1 | 5/2018 | Good et al. | |
| 2018/0222569 A1 | 8/2018 | Brakes | |

OTHER PUBLICATIONS

Extended European Search Report, dated Feb. 18, 2020, regarding Application No. 19197376.7, 8 pages.

Notice of Reasons for Rejection, dated Mar. 14, 2023, regarding Japanese Application No. 2019-159380, 11 pages.

* cited by examiner

MANUFACTURE AND PROCESS FOR INHIBITING WEAR IN A LATCH SYSTEM

BACKGROUND INFORMATION

1. Field

The present disclosure relates generally to a latch system and, in particular, to a method, an apparatus, and a system for inhibiting wear of components of a latch system including a lock translating through a moveable lock receptor.

2. Background

Manufacturing a latch system can involve assembling large numbers of components to form the latch system. The latch system may be used to secure moving parts to operate in conjunction with each other for some period of time. Without limitation the latch system may include as lock receptors, lugs with openings through which a lock may translate.

A latch system may include a lock that translates through openings in a number of lock receptors. A non-limiting example of a lock may be a pin or a piston, and a lock receptor may be a lug with an opening sized to receive the lock. A latch system may experience certain loads as it translates between a closed, or fully latched position, and an open, or fully unlatched position. Dependent upon loads on the lugs, the latch system may experience different loads once it is in the closed position than it experiences while translating through the openings in the number of lugs.

Distinct parts may be connected by a latch system that includes a lock that translates through openings in lugs that belong to each of the distinct parts, such that a central axis of the lock substantially aligns with a central axis of each opening in each lug. A clearance between a side of the lock, and the interior of an opening must allow for translation of the lock, yet be tight enough to control produce a desired connection and load transfer between the distinct parts. A technical problem may exist in translating the lock into place between the lugs. A technical problem may exist in maintaining sufficient contact between the lock and the openings once the lock is placed within the openings.

A bushing fitted within an opening in a lug may be used to aid translation of the lock through the openings and to enhance a desired contact and clearance, between the side of the lock and the interior of the openings, that produces the desired connection and load transfer between the distinct parts being connected by the latch system.

Commonly, the type and amount of material, as well as a size and weight of a bushing are designed based upon the loads a particular bushing is designed to experience during its use and lifecycle as the connected distinct parts function together for their designed usage. Thus, for a lock that is inserted between lugs and remains there while in service, such as without limitation, a bushing for a common lug in clevis type latch system may be designed to withstand static or rotational loads in a shear plain. In other words, the bushing may be sized and strengthened to withstand double shearing loads from the lug and from the lock.

Likewise, cost and material usage manufacturing choices for such bushings usually dictate that the bushing contain the least amount of material in the smallest size that will accept and handle expected design loads on the bushing from the lock and the lug during use of the connected parts. In some environments, it is also desirable that the bushing be as light weight as possible. A non-limiting example of such an environment may be joining parts of an aircraft wing together or joining an aircraft wing to an aircraft fuselage.

When one of the lugs that the lock must translate through is movable, a central axis of an opening in the moveable lug may not exactly align, as the lock begins its translation through the lugs, with a central axis of an opening of a fixed lug and a central axis of the lock that translates through the openings. A non-limiting example of a movable lug may be a lug, on a folding wing tip, on an aircraft, that aligns with fixed lugs on a fixed portion of a wing connected to the folding wing tip.

Hence a technical problem currently exists when a lock translating through a fixed lug impinges a part of a moveable lug, or a bushing therein, whose central axis may not be in exact alignment with the fixed lug. The technical problem may include undesired forces and wear upon a surface of the lock and upon surfaces of the moveable lug and/or surfaces of the bushing therein. The forces, from impacting the moveable lug or bushing therein, upon the lock may cause a central axis of the lock to skew from alignment with its axis of lateral translation through the lugs, and thus skew from an axis of translation of an actuator within the lock, and skew from a central axis of an opening in a fixed lug.

Currently, such skewing between the central axis of the lock and the central axis of the fixed lug may cause further technical problems beyond wear on the lock and the moveable lug. Such skewing may also cause wear on parts of the fixed lug, as well as wear on, gapping at, and leakage, through a gland around the actuator within the lock as well as on surfaces and seals around a head of the actuator.

Thus, a need exist for a solution to the technical problems listed above as well as possible other issues. Therefore, it: would be desirable to have a system and process for manufacturing a manufacture and process that take into account at least some of the technical problems and issues discussed above, as well as other possible issues. For example, it would be desirable to have a system and process for manufacturing a manufacture and process that overcome a technical problem with wear on and/or leakage past components of a latch system, and in particular a latch system that includes a moveable lock receptor.

SUMMARY

An embodiment of the present disclosure provides a manufacture configured to inhibit, from wear, a gland around an actuator in a latch system. The latch system may include: a lock configured to translate through: the manufacture fitted within a first opening in a first fixed lock receptor of the latch system; and an opening in a moveable lock receptor.

Another embodiment of the present disclosure provides a process for inhibiting, from wear, a lock in a latching system comprising: a gland surrounding an actuator translating the lock through: a first fixed lock receptor comprising a first opening, and a moveable lock receptor comprising an opening. The process may include: inhibiting a skewing, of a lock central axis of the lock with the lock translating through the first opening and the opening in the moveable lock receptor, away from substantially aligning with: a first central axis of a first opening of the first fixed lock receptor, and an actuator central axis of the actuator. The inhibiting may be via fitting a first translation guide into the first fixed lock receptor.

Yet another embodiment of the present disclosure provides a process for inhibiting wear of a gland around an actuator in a lock translating through: a first fixed lock receptor, and a moveable lock receptor in a latched position, in a latching system. The process may include inhibiting: leaking, past the gland, of an actuator fluid within the lock; and skewing of an actuator central axis of the actuator away from substantially aligning with: a lock central axis of the lock; and a first central axis of the first opening. The inhibiting may be via shrink-fitting a first translation guide into a first opening in the first fixed lock receptor.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
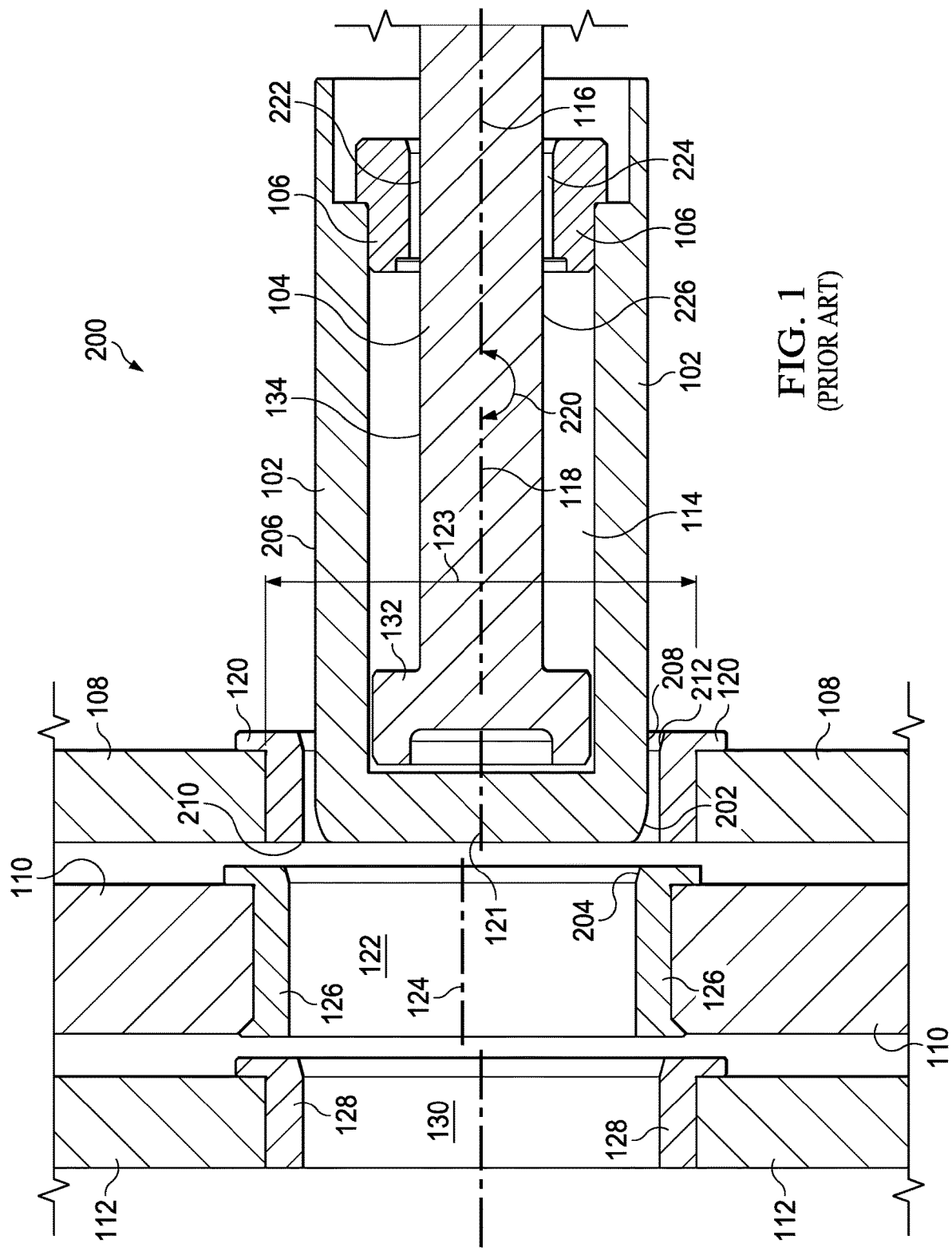
FIG. 1 is an illustration of a cross-sectional view of a current latch system in unlocked position in accordance with an illustrative embodiment.

The illustrative embodiments recognize and take into account one or more different considerations. For example, the illustrative embodiments recognize and take into account that currently manufactured and produced latch systems may suffer technical problems of wear and/or leakage of components. However, the illustrative embodiments recognize and take into account that the current manufacture and process for latch systems, and particularly with latch systems that have a moveable lock receptor, may not provide technical benefits that overcome the technical problems of wear and/or leakage of components of the latch system.

The illustrative embodiments also recognize and take into account that current design criteria and production of a translation guide for lock receptors in latch systems maintaining a desired angle, relative to a central axis of a fixed lock receptor in the lock receptors, of a side of a lock translating through lock receptors. For example, the illustrative embodiments recognize and take into account that with currently used bushings, when a lock translates through a number of lock receptors that include a moveable lock receptor, that a central axis of the lock may skew away from a central axis of a fixed locked receptor. When that angle deviates more than some threshold amount, the skewing causes undesired wear on components of the latch, including, without limitation, a surface of the lock, a fixed lock receptor, a bushing for a lock receptor, and a gland around an actuator for the lock.

The illustrative embodiments recognize and take into account that skewing of the lock central axis relative to a central axis of the actuator may also cause a technical problem of an undesired gap forming between a gland around the actuator for the lock and the actuator for the lock. The illustrative embodiments recognize and take into account that a gap around the gland may cause a loss of an actuator fluid from inside the lock to outside of the lock. Loss of actuator fluid form within the lock may cause a degradation of translation capability of the lock. Loss of actuator fluid may require additional servicing of the lock and/or actuator. Additional servicing may increase a cost of operation of an article that contains the latch. Additional servicing may require removing the article that contains the latch from operation. Such a removal may incur and increase direct operating costs for the article that contains the latch. Such a removal may incur and increase associated operating costs for the article that contains the latch. Without limitation, associated costs may include a loss of revenue producing activity for the article while the latch removed from operation for service.

The illustrative embodiments recognize and take into account that skewing of the lock central axis relative to a central axis of the actuator may also cause a technical problem of an undesired gap forming between a seal around a head of the actuator within the lock and an interior the lock. An undesired gap between a seal around a head of the actuator within the lock and an interior the lock may inhibit an ability to control movement of the lock along the length of the actuator.

Thus, the illustrative embodiments provide a process, a manufacture, and/or a system for manufacturing a translation guide for a latch system that includes a moveable lock receptor.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

As used herein, a first component, "connected to" a second component, means that the first component can be connected directly or indirectly to the second component. In other words, additional components may be present between the first component and the second component. The first component is considered to be indirectly connected to the second component when one or more additional components are present between the two components. When the first component is directly connected to the second component, no additional components are present between the two components.

In the illustrative embodiments, one or more technical solutions are present that overcome a technical problem with wear on components of a latch system. As a result, one or more technical solutions may provide a technical effect of inhibiting wear on components of the latch system. For example, illustrative embodiments herein may provide one or more technical solutions in which at least one of central axis alignment is maintained for components in latch system. In other words, a desired angle is maintained among central axis of components of a latch as a lock translates through lock receptors in the latch system. One or more technical solutions enable inhibition of wear on various components within the latch system.

For example, one or more technical solutions enable a first translation guide to sustain alignment of components in a latch system in alignment at a particular angle during translation of a lock in the latch system such that wear on components of the latch system is inhibited. FIGS. 1-4 illustrate, without limitation, an example for technical problems of undesired: friction, skewing, wear, and leakage of components in current latch systems.

Turning now to FIG. 1, an illustration of a cross-sectional view of a current latch system in unlocked position is depicted in accordance with an illustrative embodiment. As depicted, current latch system 100 may be a part of a larger article (not shown in FIG. 1). Without limitation, current latch system 100 may be used to secure a first part (not shown in FIG. 1) that may be hinged to a second part (not shown in FIG. 1), such that one of the parts contains at least one fixed lug and the other part contains at least one moveable lug 110.

In some embodiments the hinged parts may include a wing root and a wing tip of an aircraft. Current latch system 100 shown in FIGS. 1-4 depicts technical problems resulting in undesired wear of components in comparable current latch system 100, that will be overcome by embodiments shown by FIGS. 5-8. Current latch system 100 shown in FIGS. 1-4 depicts technical problems resulting in undesired leakage of actuator fluid in comparable current latch systems, which will be overcome by embodiments shown by FIGS. 5-8.

Current latch system may comprise a number of different components. As used herein, "a number of," when used with reference to components or items means one or more components or items. As depicted, current latch system 100 comprises: lock 102, actuator 104, gland 106, first fixed lug 108, moveable lug 110, second fixed lug 112, interior chamber 114, actuator central axis 116, and lock central axis 118, first bushing 120, first central axis 121, first opening 123, moveable opening 122, moveable central axis 124, moveable bushing 126, second bushing 128, second opening 130, head 132 of actuator 104, and rod 134 of actuator 104. Lock 102 may be configured as a cylinder with interior chamber 114 and actuator 104.

Interior chamber 114 may be filled with actuator fluid such that lock 102 may function as a piston actuated by fluid flow through head 132 of actuator 104 in interior chamber 114 that causes translation of lock 102 along actuator 104. Gland 106 refers to the component that is connected to and moves with lock 102 to prevent actuator fluid leakage from inside interior chamber 114 to outside of interior chamber 114. Gland 106 may include rigid components and compressible seals associated therewith.

Hence, lock 102 may be configured as a cylinder with a piston rod inside an interior chamber of the cylinder. However, instead of the piston rod moving inside the interior chamber of the cylinder, the cylinder moves relative to the piston. The moving cylinder may serve as lock 102 that translates along the piston rod 134 serving as actuator 104 for the lock 102 translation. Gland 106 may be configured around actuator 104 to prevent leakage of fluid from inside of interior chamber 114 to outside of lock 102. Actuator 104 may have actuator central axis 116.

Actuator 104 may be composed of a metal, such as without limitation, stainless steel. Head 132 of actuator 104 may also include compressible seals (not shown) associated therewith that prevent passage of an actuator fluid from one side of head 132 to another side of head 132.

First fixed lug 108 may be directly connected to a structure (not shown) and be configured to: receive lock 102, allow lock 102 to translate through first fixed lug, and steady lock 102 within first fixed lug 108 when current latch system 100 is in unlocked position. First fixed lug 108 may have first opening 123 sized to allow translation of lock 102 through first opening. First fixed lug 108 and first bushing 120 may be located within first opening. First bushing 120 is commonly sized per engineering standards such as those available in, without limitation:

i. Machinery's Handbook (29th Edition), section titled, "PLAIN BEARINGS" (page 2314). ISBN: 978-0-8311-2901-9. Three classes of bearings are described (radial, thrust, and guide).

ii. Standard Handbook of Machine Design, 3rd Edition by Joseph E. Shigley and Charles R. Mischke and Thomas H. Brown McGraw-Hill Engineering. Chapter 19 JOURNAL BEARINGS.

iii. Marks' Standard Handbook for Mechanical Engineering by Eugene A. Avallone and Theodore Baumeister (eds) McGraw-Hill Engineering 1996. Section 8.4 FLUID FILM BEARINGS.

Commonly, first bushing 120 is sized to carry loads expected of a clevis/pin type connection during use of the article once the first part is connected to the second part (similar to position shown by FIG. 4), and to allow translation of the pin/lock through first opening. With lock 102 in unlocked position as shown in FIG. 1, lock central axis 118 aligns with and overlies actuator central axis 116 and first central axis 121.

Moveable lug 110 is configured to move relative to first fixed lug 108 and second fixed lug 112 and to a structure (not shown in FIG. 1). First fixed lug 108 and second fixed lug 112 are components of the structure. Moveable lug 110 may have moveable opening 122 sized to allow translation of lock 102 through moveable opening.

Moveable opening 122 may have moveable central axis. Moveable opening 122 is fixed within and not moveable relative to moveable lug 110, but does move relative to first opening. Without limitation, movement of moveable lug 110 relative to first lug may be a rotation about a hinge (not shown) on a structure (not shown) of which first lug is a part.

Other forms and direction of motion may be possible for moveable lug 110 relative to first lug. Moveable central axis 124 is fixed relative to moveable opening 122 and moveable lug 110, and not moveable relative to moveable lug 110, but does move relative to first opening 123 and to first central axis 121.

Moveable bushing 126 may be located within moveable opening. Moveable lug 110 and moveable bushing 126 are commonly sized per engineering standards such as those available in, without limitation:

i. Machinery's Handbook (29th Edition), section titled, "PLAIN BEARINGS" (page 2314). ISBN: 978-0-8311-2901-9. Three classes of bearings are described (radial, thrust, and guide).
  ii. Standard Handbook of Machine Design, 3rd Edition by Joseph E. Shigley and Charles R. Mischke and Thomas H. Brown McGraw-Hill Engineering. Chapter 19 JOURNAL BEARINGS.
  iii. Marks' Standard Handbook for Mechanical Engineering by Eugene A. Avallone and Theodore Baumeister (eds) McGraw-Hill Engineering 1996. Section 8.4 FLUID FILM BEARINGS.

Figure 4:
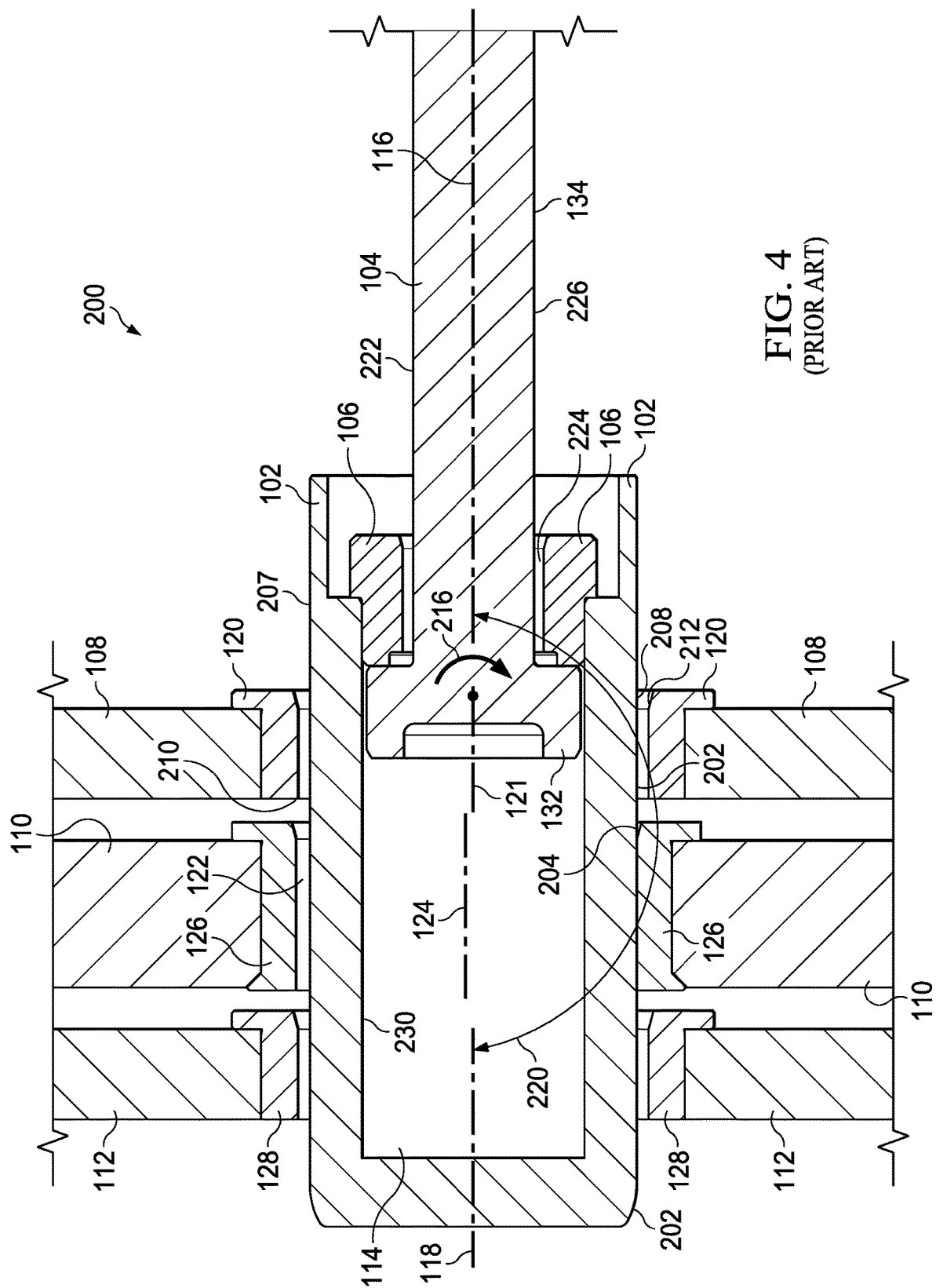
FIG. 4 is an illustration of a current latch system with a lock in locked position is depicted in accordance with an illustrative embodiment.

Moveable bushing 126 is accordingly sized and formed to: steady lock 102 within moveable opening, facilitate translation of lock 102 through moveable opening, and carry loads between moveable lug 110 and lock 102 that prevent movement of moveable lug 110 away from first fixed lug 108 and second fixed lug 112 when lock 102 is in locked position shown by FIG. 4 (with latch system in a latched position).

Second fixed lug 112 may be fixed to the structure (not shown) holding first fixed lug 108 and be configured to: receive lock 102, allow lock 102 to translate through second fixed lug 112, and steady lock 102 within second fixed lug 112 when current latch system 100 is in locked position. Second fixed lug 112 may have second opening 130 sized to allow translation of lock 102 through second opening. Second bushing 128 may be located within second opening 130.

Second fixed lug 112 and second bushing 128 are commonly sized per engineering standards such as those available in, without limitation:

i. Machinery's Handbook (29th Edition), section titled, "PLAIN BEARINGS" (page 2314). ISBN: 978-0-8311-2901-9. Three classes of bearings are described (radial, thrust, and guide).
  ii. Standard Handbook of Machine Design, 3rd Edition by Joseph E. Shigley and Charles R. Mischke and Thomas H. Brown McGraw-Hill Engineering. Chapter 19 JOURNAL BEARINGS.
  iii. Marks' Standard Handbook for Mechanical Engineering by Eugene A. Avallone and Theodore Baumeister (eds) McGraw-Hill Engineering 1996.Section 8.4 FLUID FILM BEARINGS.

Second bushing 128 is accordingly sized and formed to: steady lock 102 within second opening, facilitate translation of lock 102 through second opening, and transfer loads between second fixed lug 112 and lock 102 when lock 102 is in locked position shown by FIG. 4 (with latch system in a latched position).

Figure 2:
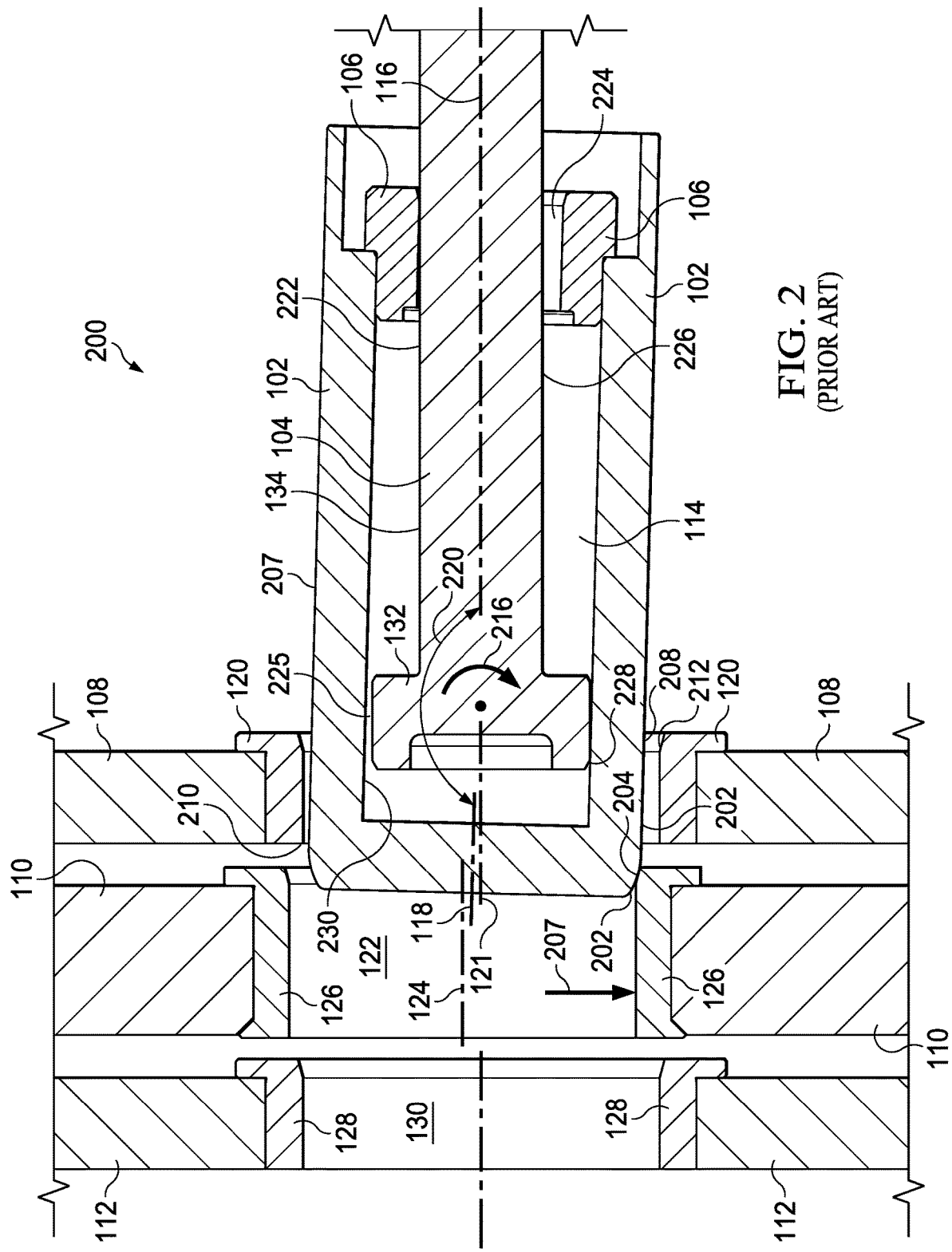
FIG. 2 is an illustration of a cross-sectional view of a current latch system with a lock in translation between unlocked position and locked position in accordance with an illustrative embodiment.

With reference now to FIG. 2, an illustration of a cross-sectional view of a current latch system 100 with a lock 102 in translation between unlocked position and locked position is depicted, in accordance with an illustrative embodiment. Unlocked position is shown by FIG. 1. Locked position is shown by FIG. 4 (with latch system in latched position). In the illustrative example, lock 102 has moved to the left from its position within first fixed lug 108 as shown in FIG. 1, and has made contact with moveable lug 110. As shown in FIG. 2, moveable lug 110 is in latched position 200, but moveable lug 110 and moveable central axis 124 are no longer substantially aligned with first central axis 121 or lock 102 central axis. Herein, latched position is defined by moveable lug 110 being positioned relative to first fixed lug 108 and second fixed lug 112 such that lock 102 can translate through all three lugs.

Figure 3:
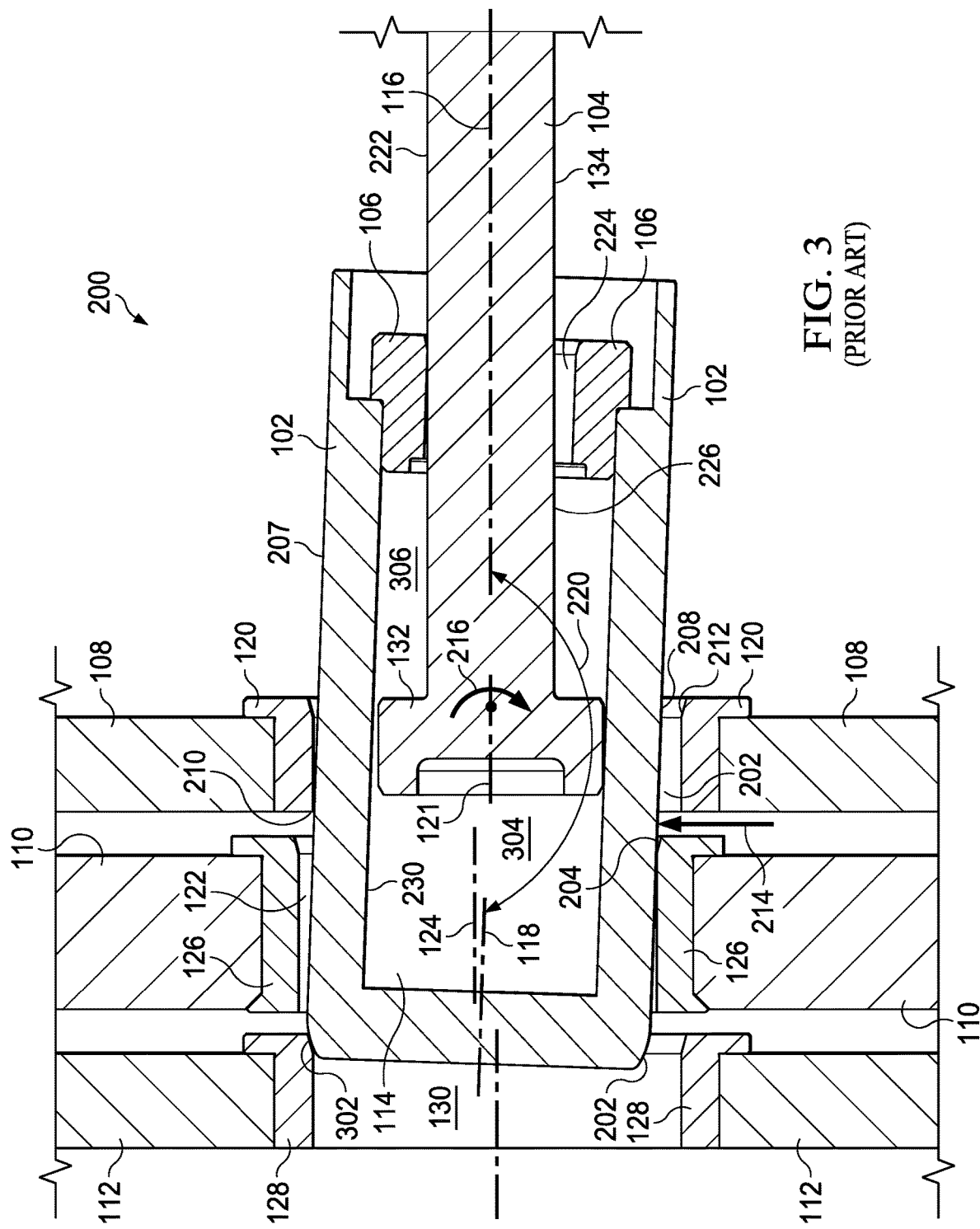
FIG. 3 is an illustration of a cross-sectional view of current latch system with a lock in translation between unlocked position and locked position in accordance with an illustrative embodiment.

Also shown in FIG. 2 is the result of moveable lug 110 misalignment from lock 102 central axis, where chamfered corner 202 of lock 102 contacts corner 204 of moveable bushing 126 in moveable lug 110 and applies force 206 to moveable lug 110 that moves moveable lug 110 and moveable opening 122 downward sufficiently to allow lock 102 to continue translation through moveable opening, as shown in FIGS. 3-4. Force 206 causes undesired friction and wear upon: chamfered corner, moveable bushing 126, lock 102—along surface 207 of lock 102 and surface 208 of lock 102, and first bushing 120 at point 210 and at point 212.

Movable lug produces a force 214 on lock 102 commensurate to force 206. Force 214, transferred through second bushing 128 to lock 102, creates a moment 216 about head 132 of actuator 104 within interior chamber 114. Moment 216 causes lock central axis 118 to skew away from alignment with first central axis 121 and actuator central axis 116 at angle 220. As long as lock central axis 118 remains skewed from actuator central axis 116 while lock 102 is translating along actuator 104, the skewing of lock 102 may cause undesired compression, friction, and wear, on gland 106 and along side 222 of actuator 104. The skewing of lock 102 may cause an undesired gap 224 to open between gland 106 and side 226 of actuator 104 as force 214 acts on lock 102. Additionally, over time, the undesired compression, friction, and wear of gland 106 can reduce integrity and size of gland 106 enough to cause a permanent gap to develop between gland 106 and side 222 of actuator 104.

Likewise, the skewing of lock 102 may cause undesired compression, friction, and wear, on head 132 of actuator 104 and alongside 228 of interior chamber 114 of lock 102. The skewing of lock 102 may cause an undesired gap 225 to open between side 230 of interior chamber 114 and head 132 of actuator 104 as force 214 acts on lock 102. Additionally, over time, the undesired compression, friction, and wear of gland 106 can reduce integrity and size of gland 106 enough to cause a permanent gap to develop between gland 106 and side 222 of actuator 104.

While FIGS. 1-4 show results of moveable lug 110 and moveable central axis 124 being displaced above first lug and first central axis 121, one of ordinary skill in the art understands that the displacement could also be below, and that inverse affects could result causing damages inverse to those described above. Over time, as displacements both up and down occur, undesired wear, gaps, and leakage can result to along both sides of gland 106, both sides of central rod 134 of actuator 104 as well as both sides of head 132 of actuator 104. Of course, the descriptions herein are relative to the cross-sectional view presented by these figures. One of ordinary skill in the art understands that the items are actually three-dimensional and that the undesired compression, friction, and wear described are not actually occurring on one side or another, but may occur all around the inner and/or outer circumferences, as appropriate, of the lock 102, interior chamber 114, head 132, gland 106, and/or rod 134 discussed.

With reference next to FIG. 3, an illustration of a cross-sectional view of a current latch system 100 with a lock 102 in translation between unlocked position and locked position is depicted in accordance with an illustrative embodiment. In the illustrative example, lock 102 has moved further to the left, from its positions shown in FIGS. 1 and 2, and has made contact with second bushing 128 in second fixed lug 112. FIG. 3 shows that force 214 on moveable lug 110 has prevented force 206 from lock 102 from bringing moveable central axis 124 fully into alignment with first central axis 121, second central axis, and actuator central axis 116. As a result, chamfered corner 302 of lock 102 impinges upon second bushing 128. As a result, undesired friction and wear occur to second bushing 128 and chamfered corner 302.

In other words, as lock 102 translates through moveable lug 110 it exerts force 206 to align moveable central axis 124 with actuator central axis 116. However, as long as lock central axis 118 remains skewed from actuator central axis 116 while lock 102 is translating along actuator 104, surface and surface of lock 102 experience undesired friction and wear. In other words, lock central axis 118 is skewed away from alignment with actuator central axis 116 and first lug central axis by force 214 from moveable lug 110 on lock 102. As a result, gland 106, and seals associated therewith, suffers undesired compression, friction and wear from actuator 104. Also as a result of the skewing, and compression and wear on gland 106, undesired gap results between gland 106 and interior wall of lock 102. Undesired gap results in undesired leakage of actuator fluid from within interior chamber 114 of lock 102.

Likewise, as long as lock central axis 118 remains skewed from actuator central axis 116 while lock 102 is translating along actuator 104, head 132, and seals associated therewith, and interior chamber 114 suffer undesired compression, friction and wear from actuator 104. Also as a result of the skewing, and compression and wear on head 132 and interior chamber 114, undesired gap 225 results between head 132 and side 230 of interior chamber 114 of lock 102. Undesired gap 225 results in undesired leakage of actuator fluid between area 304 of interior chamber 114 and area 306 of interior chamber 114.

Normal translation of lock 102 may occur from actuator fluid being regulated by actuator 104 to move between area 304 and area 306. When leakage occurs between area 304 and 306, then translation of lock 102 along actuator 104 cannot be properly regulated.

With reference next to FIG. 4, an illustration of a cross-sectional view of a current latch system 100 with a lock 102 in locked position is depicted in accordance with an illustrative embodiment. In the illustrative example, lock 102 has moved further to the left, from its positions shown in FIGS. 1-3, and is seated within second fixed lug 112. Without limitation, loads experienced in lock 102 and lugs may be shear, or other loads.

In this cross-sectional view, second central axis is substantially aligned with: lock 102 central axis, first central axis 121, actuator central axis 116, and moveable central axis. Lock 102 is sufficiently secured within second bushing 128, moveable bushing 126, and first bushing 120 such that lock 102 receives and carries loading from each of: second lug, moveable lug 110, and first lug. Lock 102 is sufficiently secured within second bushing 128, moveable bushing 126, and first bushing 120 such that lock 102 holds latch system in latched position shown by FIG. 4. FIG. 4 represents the operational condition that currently directs design and manufacture of bushings in current latch system 100.

The locked position for current latch system 100 shown by FIG. 4 is the position where loads on first part and loads on second part of article may attempt to move first part away from second part. In FIG. 4, lock 102 resists movement of moveable lug 110 away from the first lug and the second lug, and thus prevents movement of the first part away from the second part. The locked position for current latch system 100 shown by FIG. 4 is the position used to determine maximum expected loading, on first bushing 120, moveable bushing 126, and second bushing 128, that is used to determine without limitation size, shape, strength, hardness, and/or other characteristics for each of first bushing 120, moveable bushing 126, and second bushing 128 commonly found in latch systems represented by the embodiment illustrated for current latch system 100.

Figure 5:
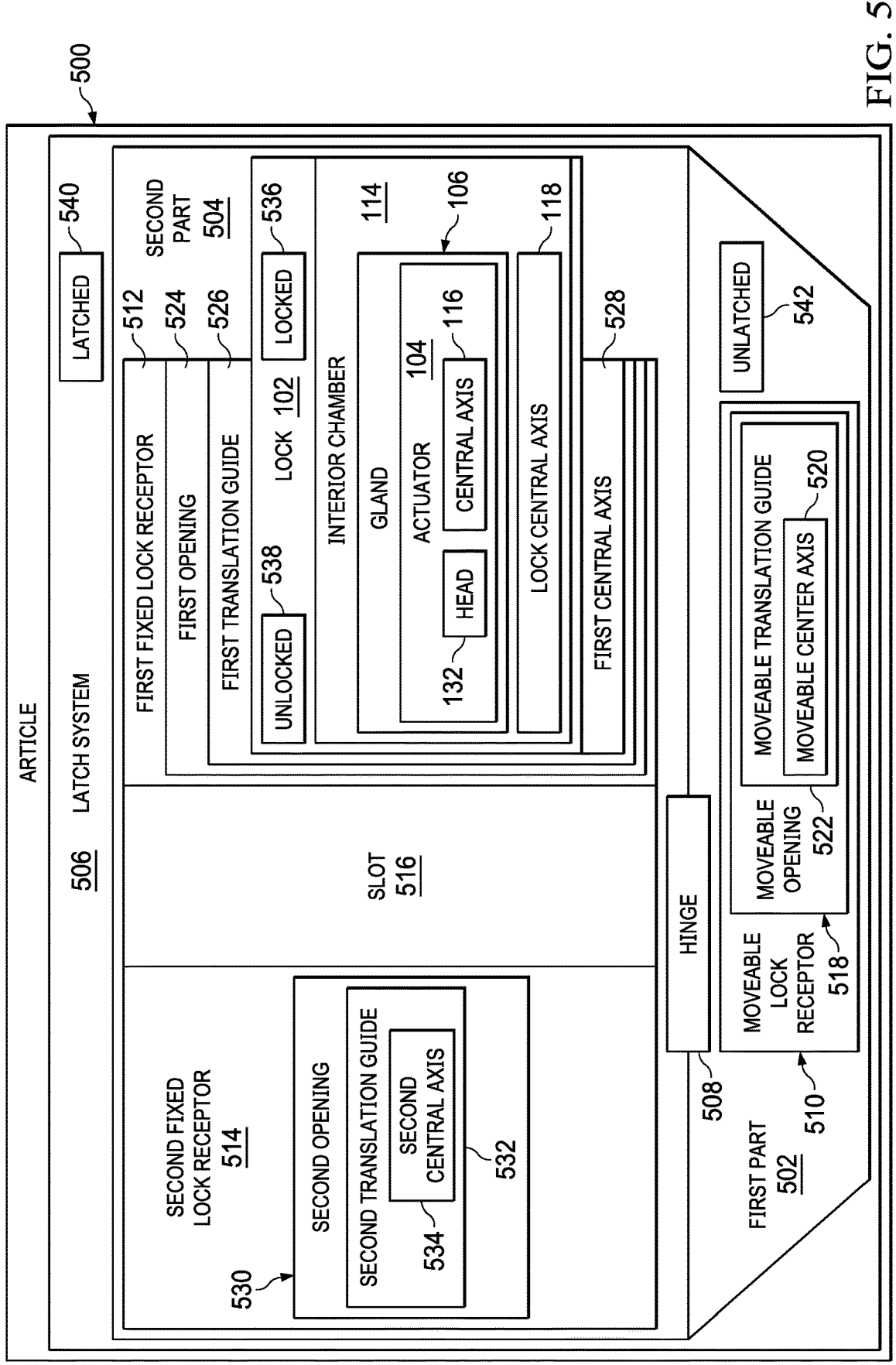
FIG. 5 is an illustration of block diagram of a latch system in accordance with an illustrative embodiment.

Turning now to FIG. 5, an illustration of a block diagram of a latch system 600 is depicted in accordance with an illustrative embodiment. More specifically, article 500 may be made of first part 502 and second part 504. First part 502 and second part 504 may be connected by latch system 600, 506. Without limitation, connection between first part 502 and second part 504 may include hinge 508. First part 502 may rotate about hinge 508 configured to allow first part 502 to be moveable relative to second part 504, which is fixed to article 500.

First part 502 may include a protrusion such as moveable lock receptor 604, 510. Moveable lock receptor 604 remains connected to or incorporated into first part 502, and may be fixed to first part 502, but is moveable relative to second part 504 of article 500. Second part 504 may be configured with first fixed lock receptor 512 512 and second fixed lock receptor 514 that are each fixed to second part 504, separated by slot 516, such that neither first fixed lock receptor 512 nor second fixed lock receptor 514 are moveable away from second part 504 or each other. Slot 516 may be sized and shaped to receive moveable lock receptor 604.

Moveable lock receptor 604 may include moveable opening 122, 518. Moveable opening 122 is an opening within moveable lock receptor 604 and is not moveable relative to first part 502. Moveable opening 122 has moveable central axis 124, 520. Moveable central axis 124 is not moveable relative to moveable lock receptor 604, but is moveable relative to second part 504.

Moveable translation guide 618 may be fitted and fixed within moveable opening 122 of moveable lock receptor 604. Moveable central axis 124 also is a central axis of moveable translation guide 618. While moveable translation guide 618 must meet the loading requirements required of moveable bushing 126 described above, it must also be configured of a size, a shape, and a material sufficient to provide stability and guidance that reduce friction between an exterior surface of lock 102 and resist skewing effects, from forces, without limitation from the moveable lock receptor 604, on lock 102 as it translates into contact with moveable translation guide 618 and translates through moveable lock receptor 604.

Moveable translation guide 618 may be made from a copper-nickel-tin alloy. Moveable translation guide 618 may be fit to remain securely within moveable lock receptor 604 with lock 102 in translation and in any position between and including locked and unlocked. Moveable translation guide 618 may be shrunk fit into moveable lock receptor 604. Moveable translation guide 618 may be frozen to be shrunk before being pressed into moveable lock receptor 604 and fit into position via expansion upon warming. Without limitation, moveable translation guide 618 may be frozen in liquid nitrogen before fitting into moveable lock receptor 604.

First fixed lock receptor 602 has first opening 524. First translation guide 526 may be configured to fit to remain, with lock 102 in translation and in any position between and including locked 536 and unlocked 538, securely within first opening 524 in first fixed lock receptor 602. First translation guide 526 may be shrunk fit into first fixed lock receptor 602. First central axis 528 may be an axis at a center of first opening 524 that may also be at a center of first translation guide 526. Similar to special design tools having a formal name, such as an Allen wrench or a Phillips head screw, a translation guide that meets the shape and sizing requirements of the first translation guide 526 described herein is also given the formal name of a Kamiscio guide 610.

Unlike, first bushing 120 that is commonly sized per engineering standards as shown above in order to: steady lock 102 within first opening 524 when lock 102 is in unlocked 538 position shown in FIG. 1 and to receive loads from first fixed lock receptor 602 when lock 102 is in locked 536 position shown by FIG. 4, first translation guide 526 must meet the loading requirements required of first bushing 120 described above, but also be configured of a size, a shape, and a material sufficient to provide stability and guidance that resist skewing effects, of forces from moveable lock receptor 604, on lock 102 as it translates into contact with and through moveable lock receptor 604.

First translation guide 526 may be formed as a copper-nickel-tin alloy. First translation guide 526 may be frozen to be shrunk before being pressed into first fixed lock receptor 602 and fit into position via expansion upon warming. First translation guide 526 may be frozen in liquid nitrogen before fitting into first fixed lock receptor 602.

Second fixed lock receptor 619 has second opening 127, 130, 530. Second translation guide 618, 532 may be configured and fit to remain, with lock 102 in translation and in any position between and including locked 536 and unlocked 538, securely within second opening 127, 130 in second fixed lock receptor 619. Second translation guide 618 may be shrunk fit into second fixed lock receptor 619. Second central axis 534 may be an axis at a center of second opening 127, 130 that may also be at a center of second translation guide 618.

Unlike, second bushing 128 that is commonly sized per engineering standards such as shown above in order transfer loads (and restrain movement of moveable lock receptor 604 away from first fixed lock receptor 602 and second fixed lock receptor 619) between second fixed lock receptor 606 and lock 102 from second fixed lock receptor 606 when lock 102 is in locked 536 position, second translation guide 618 must meet the loading requirements required of second bushing 128 described above, but also be configured of a size, a shape, and a material sufficient to provide stability and guidance that resist the skewing effects, of forces from the moveable lock receptor 604, on lock 102 as it translates into contact with second translation guide 618 fixed to second fixed lock receptor 619 and translates through second fixed lock receptor 619.

Second translation guide 618 may be made from a copper-nickel-tin alloy. Second translation guide 618 may be frozen to be shrunk before being pressed into second fixed lock receptor 619 and fit into position via expansion upon warming. Second translation guide 618 may be frozen in liquid nitrogen before fitting into second fixed lock receptor 606.

One of ordinary skill in the art will appreciate that hinge 508 connection and rotation of first part 502 represent a non-limiting embodiment of how first part 502 moves in relation to second part 504. Other types of connections and directions of motion beyond rotation may also be applicable such that moveable lock receptor 604 on first part 502 may move into and out of slot 516 on second part 504.

Each lock 102 receptor may be sized and shaped such that with its respective translation guide seated within its respective opening, lock 102 may translate through the lock 102 receptors between locked 536 536 and unlocked 538 position. 538. Unlocked 538 position exists when lock 102 does not restrict motion of moveable lock receptor 604 into or out of slot 516 and away from second part 504. Latch system 600 may be locked 536 in latched 540 position or locked 536 in an unlatched 542, position. When moveable lock 102 extends through each opening of each lock 102 receptor and moveable lock receptor 604 cannot move out of slot 516, latch system 600 is locked 536 in latched position. When moveable lock 102 extends through respective openings of each fixed lock 102 receptor on second part 504, but not through moveable opening 122 of first part 502, and moveable lock receptor 604 cannot move into slot 516, latch system 600 is locked 536 in unlatched 542 position.

Without limitation, when article 500 is an aircraft, second part 504 may be a wing, and first part 502 may be a folding wing tip, latched position may be considered and called a flight position. In other words, for aircraft to be configured for flight, folding wing tip should be locked 536 in latched position. With the aircraft parked in a ramp area or taxiing on ground, folding wingtip may be locked 536 in an unlatched 542 position.

Without limitation, although shown with only one moveable lock receptor 604, first part 502 may contain more than one moveable lock receptor 604. If first part 502 contains more than one moveable lock receptor 604, second part 504 may contain more than two (not shown) fixed lock 102 receptors, and a number of slot 516 (not shown), in addition to slot 516, configured to receive the moveable lock receptor 604.

Figure 6:
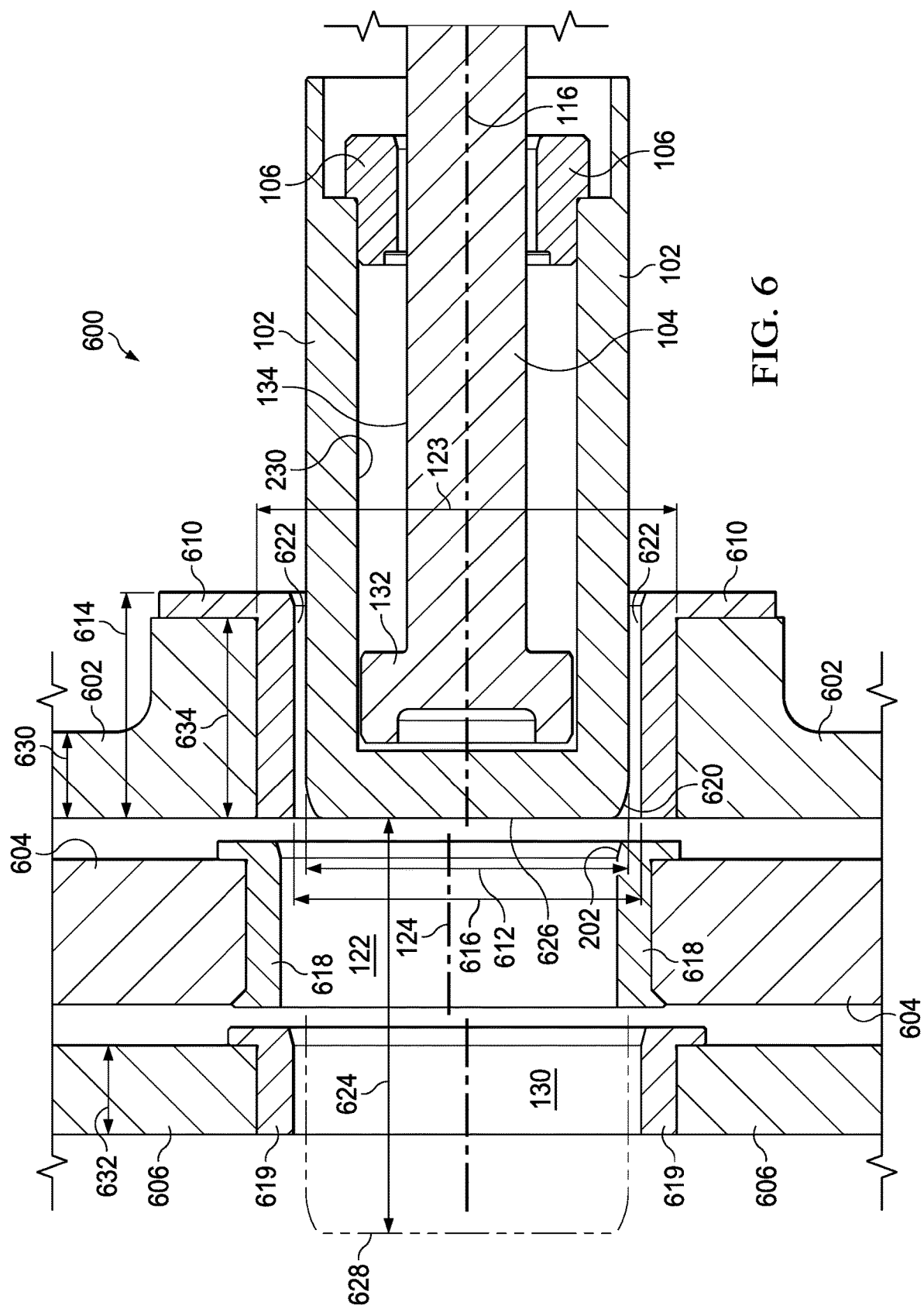
FIG. 6 is an illustration of components in a cross-sectional view of a latch system in unlocked position in accordance with an illustrative embodiment.

Turning now to FIG. 6, an illustration of a cross-sectional view of a latch system in unlocked position is depicted in accordance with an illustrative embodiment. As depicted, latch system 600 may be a part of an article 500 (not shown) larger than latch system 600. Without limitation, latch system 600 may be used to secure a first part 502 of the article 500 that may be hinged to a second part 504 of the article 500, such that the second part 504 contains at least one fixed lock receptor and the first part 502 contains at least one moveable lock receptor 604.

Figure 7:
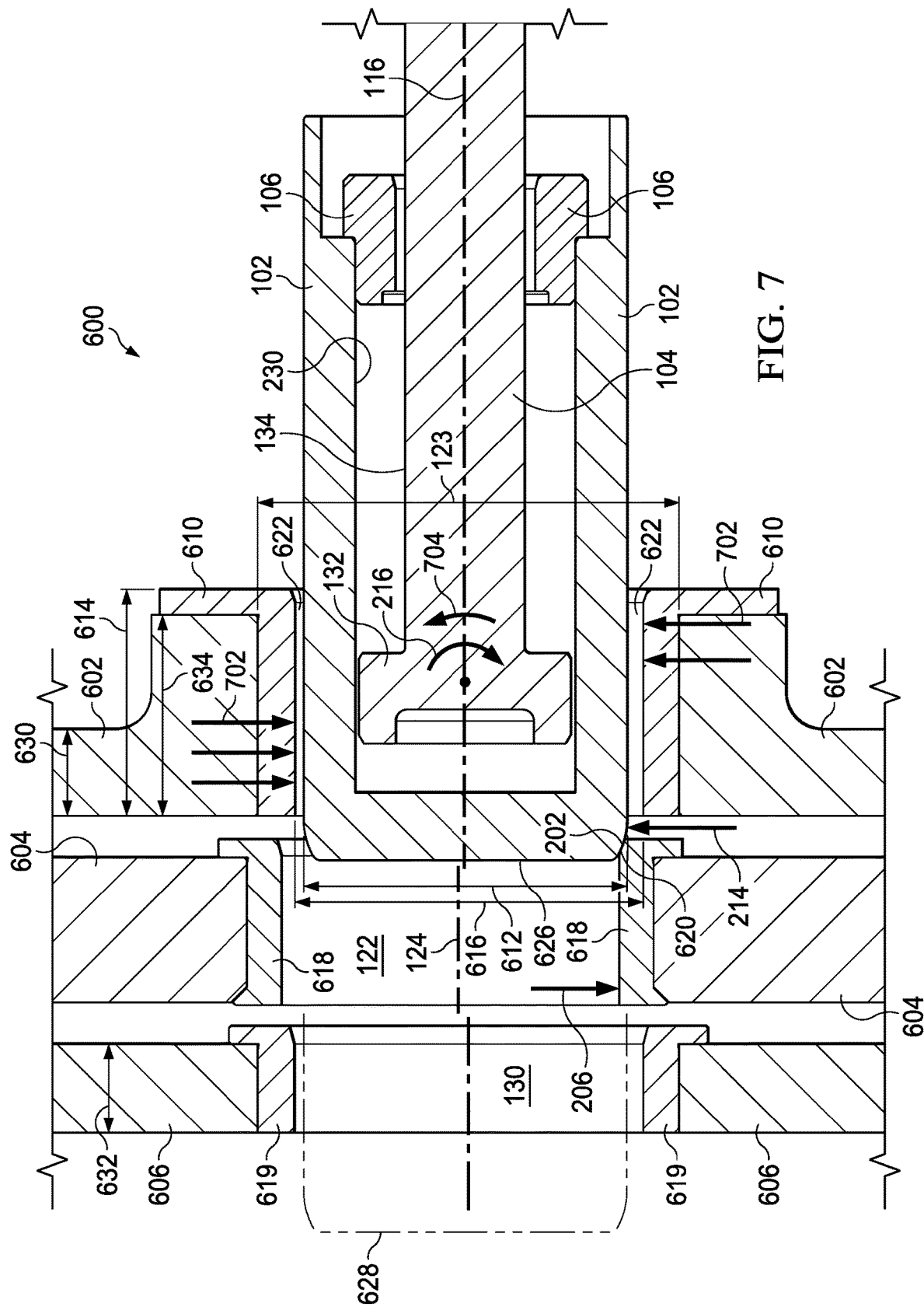
FIG. 7 is an illustration of a cross-sectional view of a latch system in accordance with an illustrative embodiment.
Figure 8:
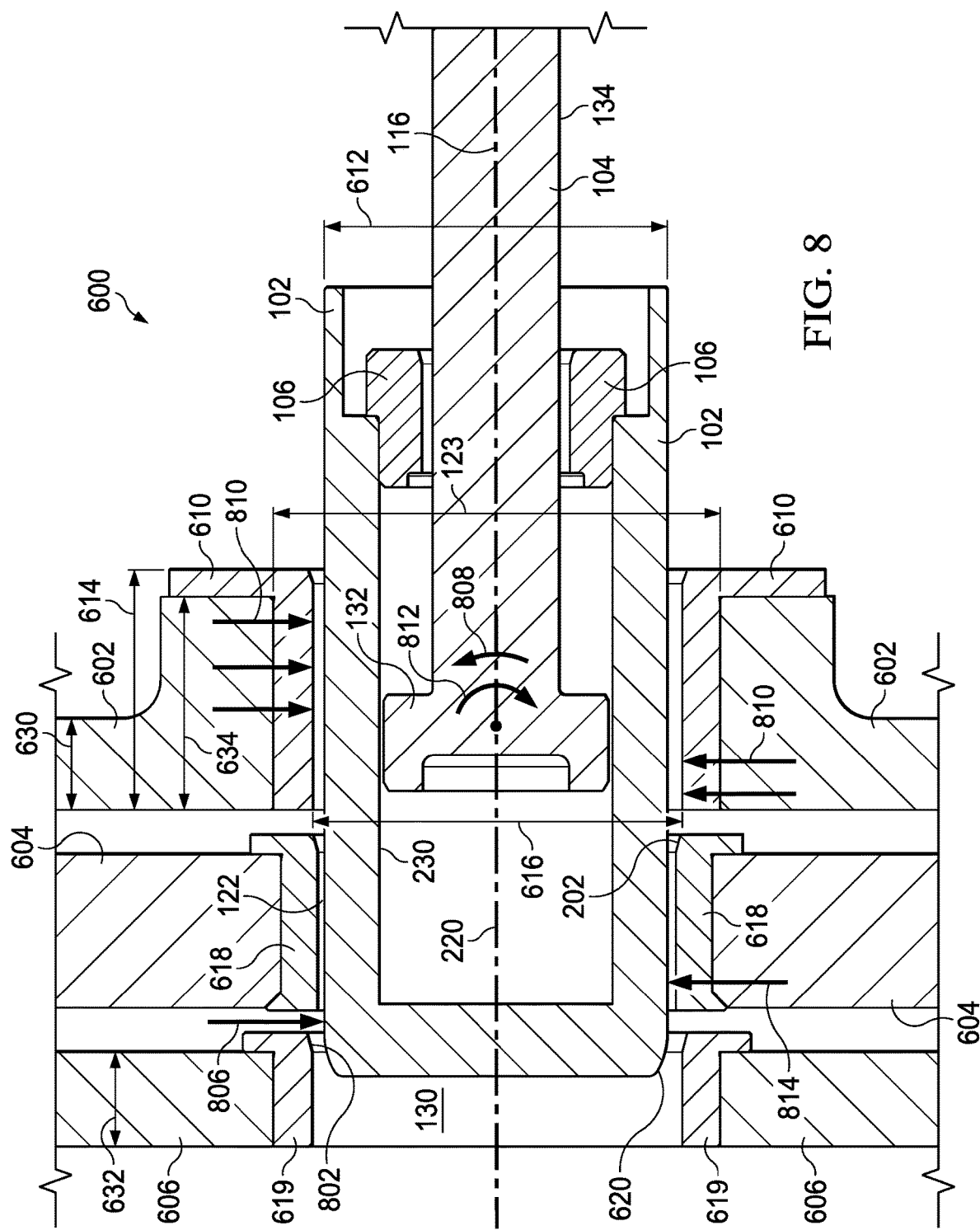
FIG. 8 is an illustration of a cross-sectional view of a latch system with a lock approaching a locked position, in accordance with an illustrative embodiment.
Figure 9A:
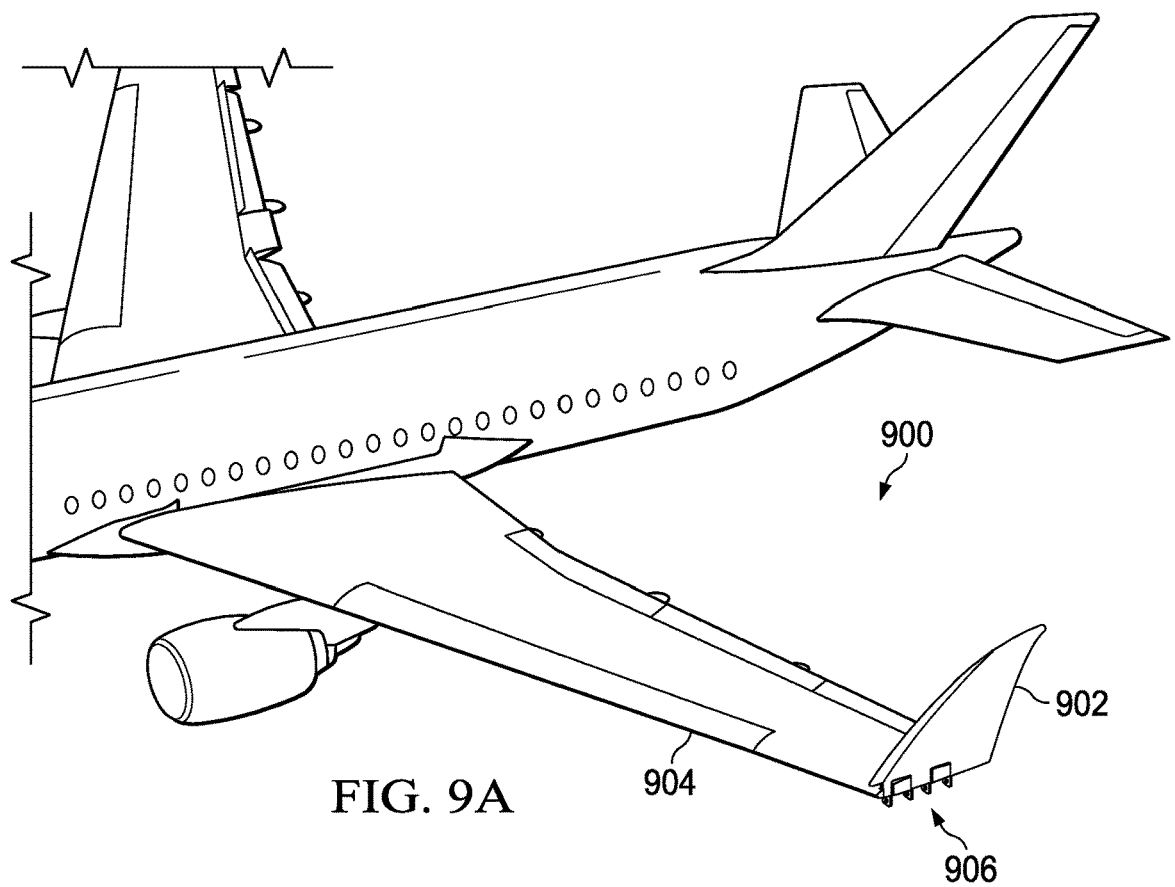
FIG. 9A is an illustration of a perspective view of a folding aircraft wing with a latch system in accordance with an illustrative embodiment.
Figure 9B:
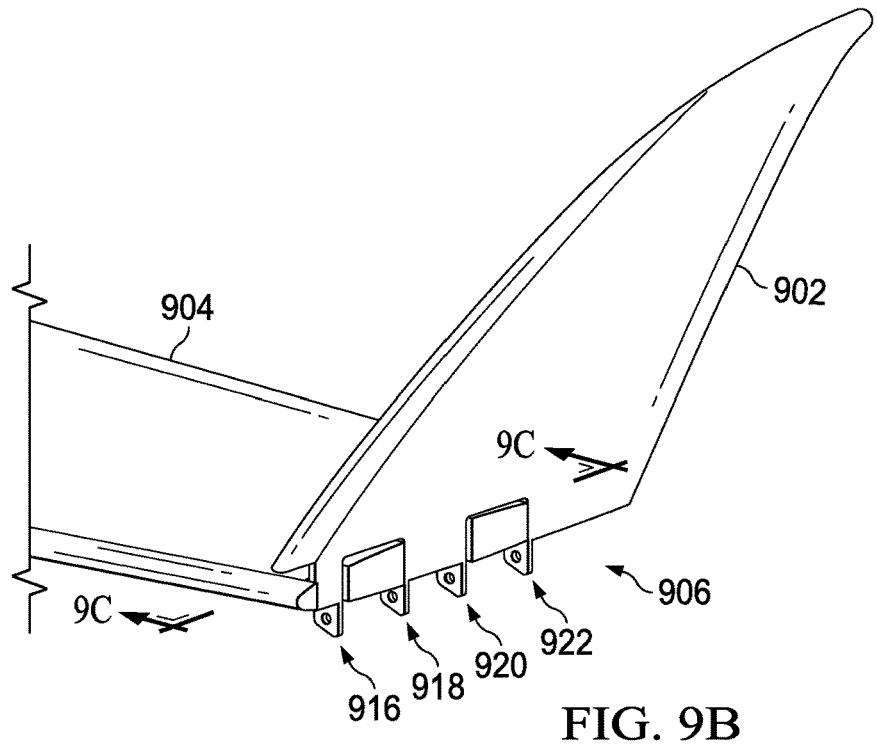
FIG. 9B is an illustration of a perspective view of a folding aircraft wing tip with a latch system in accordance with an illustrative embodiment.
Figure 9C:
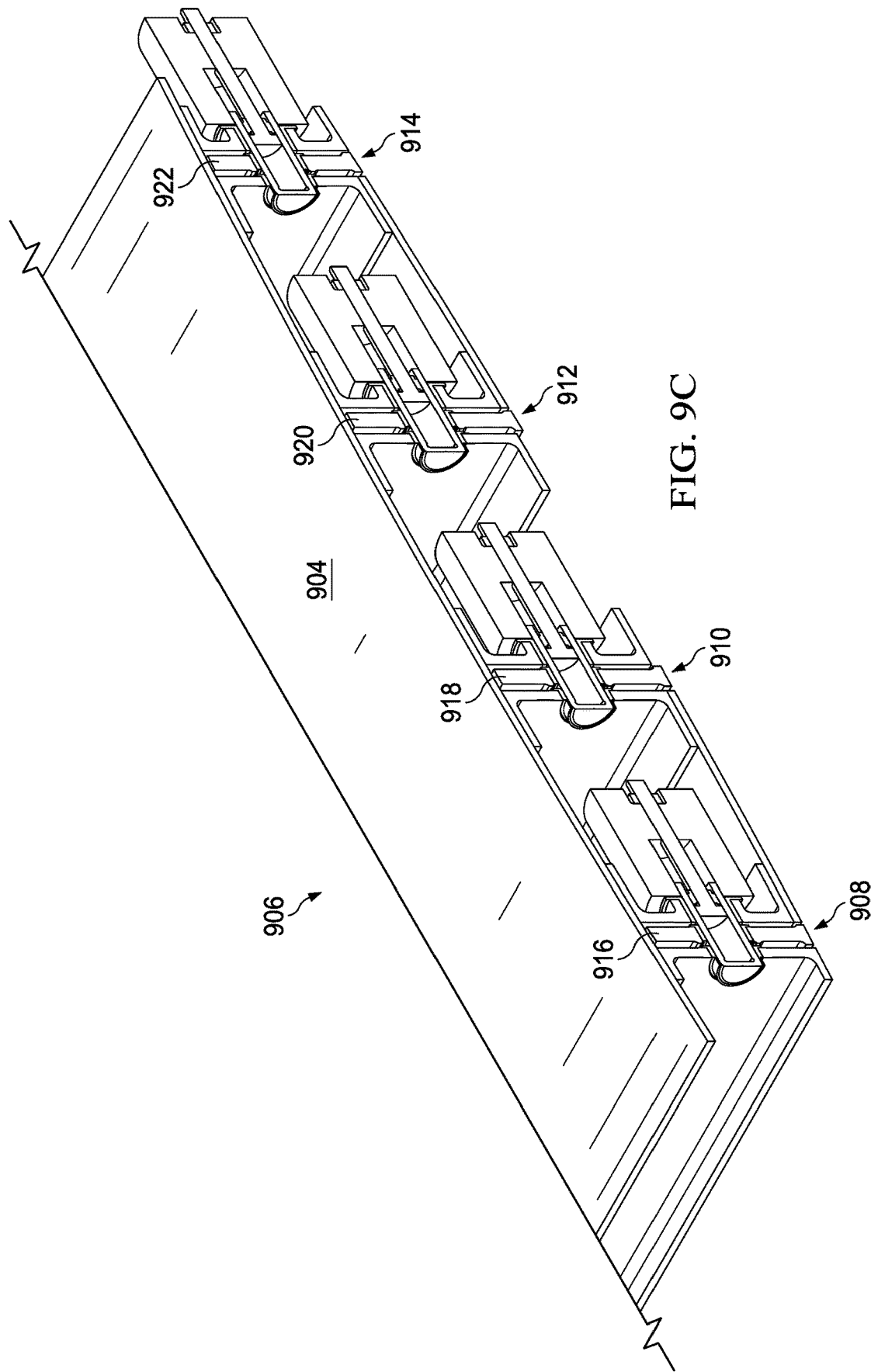
FIG. 9C is an illustration of a cross-sectional view of a latch system in a wing in accordance with an illustrative embodiment.

In some embodiments the hinged parts may include a wing tip and a wing root of an aircraft (as illustrated by FIGS. 9A-9C). Latch system 600 shown in FIGS. 5-8 depicts embodiments of a technical solution that overcomes technical problems of current latch systems, such as current latch system 100, shown without limitation in FIGS. 1-4. Latch system 600 in FIGS. 6-8 represents a non-limiting embodiment of latch system 600 for article 500 as represented in FIG. 5. Although some item numbers in FIGS. 6-9 may differ from item numbers in FIG. 5, any items in FIGS. 6-9 using the same named as is used in FIG. 5, is considered to be an example of an embodiment of that same named feature in FIG. 5.

Additionally, some components in FIGS. 1-4 for current latch system 100 may be unchanged in latch system 600. Thus, differed numbering in FIG. 5 for items with same name as the items in FIGS. 1-4 may represent an item similar to the same named item from FIGS. 1-4, and carry over into FIGS. 5-9. This does not preclude modification or redesign of such items as being possible for latch system 600/600 without degrading the advantages and improvements recited for embodiments shown and described for FIGS. 5-9.

Latch system 600 may comprise a number of different components. As depicted, latch system 600 comprises: lock 102, actuator 104, gland 106, first fixed lock receptor 602, moveable lock receptor 604, second fixed lock receptor 606, first fixed translation guide 610, moveable translation guide 618, and second fixed translation guide 619. Lock 102 may be configured as a cylinder with interior chamber 114 and actuator 104 therein. Interior chamber 114 may be filled with an actuator fluid such that lock 102 may function as a piston actuated by fluid flow within interior chamber 114 to translate lock 102 along actuator 104. Gland 106 may be configured around actuator 104 to prevent leakage of fluid, from within interior chamber 114 out of interior chamber 114, along a side of actuator 104, while facilitating translation of lock 102 along actuator 104. actuator 104 may have actuator central axis 116. Gland 106 may have components that include rigid parts and compressible seals. Rigid parts may be metal. Metal may be metal alloys.

First fixed lock receptor 602 may be fixed to a structure and be configured to: receive lock 102, to allow lock 102 to translate through first fixed lock receptor 602, and to steady lock 102 within first fixed lock receptor 602 when current latch system 100 is in unlocked 538 position. First fixed lock receptor 602 may have first opening 524, 123 sized to allow translation of lock 102 through first opening 524. First translation guide 526, 610 may be located within first opening 524. First translation guide 526, 610 may be viewed as a non-limiting embodiment of first translation guide 526 described above for FIG. 5.

Unlike, first bushing 120 that is commonly sized per current engineering standards listed above to steady lock 102 within first opening 524, 123 when lock 102 is in unlocked 538 position shown in FIG. 6 and to receive loads from first fixed lock receptor 602 when lock 102 is in locked 536 position (similar to that shown for current latch system 100 by FIG. 4), first translation guide 526 must meet the loading requirements required of first bushing 120 described above, but also be configured of a size, a shape, and a material sufficient to provide stability and guidance that resist the skewing effects, of force 214 from moveable lock receptor 604, on lock 102 as it translates into contact with and through moveable lock receptor 604. Tests have taught that first translation guide 526 must be sized relative to outer diameter 612 (measured across outer surface) of lock 102 and shaped to prevent a skewing of lock central axis 118 from substantial alignment with first central axis 528 as lock 102 translates through moveable lock receptor 604.

First translation guide 526 may be made from a copper-nickel-tin alloy. First translation guide 526 may be fit to remain securely within first fixed lock receptor 602 with lock 102 in translation and in any position between and including locked 536 and unlocked 538. First translation guide 526 may be shrunk fit into first fixed lock receptor 602. First translation guide 526 may be frozen in liquid nitrogen to be shrunk before being pressed into first fixed lock receptor 602 and fit into position via expansion upon warming.

First translation guide 526 may incorporate a lubrication system (not shown) configured to lubricate, without limitation, interior surfaces of first translation guide 526. Interior surface of first translation guide 526 may be a surface of first translation guide 526 that faces exterior surface of lock 102. Lubrication system may include a duct system that allows a lubricant to flow between an outer surface of first translation guide 526 and interior surface of first translation guide 526. An outer surface of first translation guide 526 may be a surface of first translation guide 526 that faces away from exterior surface of lock 102.

More specifically, testing has taught that a ratio of length 614 of first translation guide 526 to outer diameter 612 of lock 102 that exceeds 0.500:1, with a ratio of length 614 of the first translation guide 526 to stroke distance 624 of lock 102 that exceeds 0.559:1 restrains, during translation of lock 102 between locked 536 and unlocked 538 position, lock central axis 118 from skewing away from first central axis 528 to a degree that may cause undesired friction and/or wear on lock 102, on gland 106 and actuator 104 within lock 102, on moveable translation guide 618, and on first translation guide 526. Stroke distance 624 is the distance from location of cap 626 of lock 102 at fully retracted position as shown in in FIG. 6, to location for cap of lock 102 when lock 102 is in a fully extended position (similar to position of lock 102 shown in FIG. 4) indicated by line 628.

Additionally, a clearance 622 between outer diameter 612 of lock 102 and inner diameter 616 of first translation guide 610 to outer diameter 612 of lock 102 may be defined by a ratio between that is at least 0.0012 but no greater than 0.0067. Similar to special design tools having a formal name, such as an Allen wrench or a Phillips head screw, a translation guide that meets the shape and sizing requirements of the first translation guide 526 described above is also given the formal name of a Kamiscio guide 610.

Testing has taught that a ratio of length 614 of first translation guide 610 to outer diameter 612 of lock 102 that exceeds 0.500:1, with a ratio of length of the first translation guide 610 to stroke distance 624 626 of lock 102 that exceeds 0.559:1, restrains, during translation of lock 102 between locked 536 and unlocked 538 position, lock central axis 118 from skewing away from actuator central axis 116 and first central axis 121.

Such restraint of skewing of lock central axis 118 prevents undesired compression, friction, and wear on gland 106 and on rod 134 of actuator 104 to a degree that prevents a gap between gland 106 and actuator 104, during translation of lock 102, to become a size that allows an undesired amount of actuator fluid to leak out of interior chamber 114 of lock 102. Such restraint of skewing of lock central axis 118 prevents undesired compression, friction, and wear on interior chamber 114 of lock 102 and on head 132 of actuator 104 to a degree that prevents a gap between interior chamber 114 of lock 102 and head 132 of actuator 104, during translation of lock 102, to become a size that allows an undesired amount of actuator fluid to leak between area 304 of interior chamber 114 and area 306 of interior chamber 114.

Moreover, not only does restrain of skewing of lock central axis 118 away from actuator central axis 116 prevent leakage during translation of lock 102, but reduction of compression, friction, and wear on components produces the technical advantage of restraining permanent deformations to components that may result in undesired actuator fluid transfers or leakage when lock 102 is static as well. Permanent deformations to gland 106, actuator 104, interior chamber 114, may impair or disable the ability of actuator 104 to translate lock 102, and may require undesired premature and costly repairs or replacements of those components or of the lock 102.

Hence, as a non-limiting example, if outer diameter 612 of lock 102 measures 1 inch, then first translation guide 610 that inhibits wear of latch system 600 components will have length that exceeds 0.500 inches with stroke distance 624 of lock 102 less than 0.355 inches. Hence, as a non-limiting example, if first fixed lock receptor 602 is a lug on a fixed wing in an aircraft and lock 102 outer diameter 612 is 2.48 inches, then first translation guide 610 must be greater than 1.24 inches with stroke distance 624 of lock 102 being less than 0.878 inches.

Simultaneously, a ratio between: a clearance 622 616 between outer diameter 612 of lock 102 and inner diameter 616 of first translation guide 610, to outer diameter 612 of lock 102 may be at least 0.0012:1 but no greater than 0.0067:1. Hence, without limitation, for lock 102 with outer diameter 612 of 2.48 inches, clearance 622 between outer diameter 612 of lock 102 and inner diameter 616 of first translation guide 610 may be at least 0.0030 and no greater than 0.017 inches.

As shown by FIG. 6, for first translation guide 610 to meet the sizing requirements above, first fixed lock receptor 602 must be resized and reshaped relative to first fixed lug 108 shown above in FIGS. 1-4. Whereas, first fixed lug 108 and second fixed lug 112 are substantially symmetrically sized and shaped, to support requirements for first translation guide 610, first fixed lock receptor 602 must include an outer portion of width length 630 and a newly designed inner portion of length 634. While length 630 remains equivalent to width 632 of second fixed lug 112 designed to carry loads required with lock 102 at fully extended position indicated by line 628, the extra length 634 of inner portion of first fixed lock receptor 602 is engineered to support length requirements above for first translation guide 610 to resist loads trying to skew lock central axis 118 away from actuator central axis 116.

Moveable lock receptor 604 is configured to move relative to first fixed lock receptor 602 and second fixed lock receptor 606 and to a structure (not shown in FIG. 6) that first fixed lock receptor 602 and second fixed lock receptor 606 are a part of. Moveable lock receptor 604 may have moveable opening 122 sized to allow translation of lock 102 through moveable opening.

Moveable opening 122 may have moveable central axis 124. Moveable opening 122 is fixed within, and not moveable relative to, moveable lock receptor 604, but moveable opening 122 does move relative to first opening 524. Without limitation, movement of moveable lock receptor 604 relative to first fixed lock receptor 610 may be a rotation about a hinge 508 (as shown by FIG. 5) on a structure of which first fixed lock receptor 602 is a part. Other forms and direction of motion may be possible for moveable lock receptor 604 relative to first fixed lock receptor 602. Likewise, moveable central axis 124 is fixed relative to moveable opening 122 and moveable lock receptor 604, and not moveable relative to moveable lock receptor 604, but does move relative to first opening 1230 and to first central axis 121.

Moveable translation guide 618 may be located within moveable opening. Unlike, moveable bushing 126 that is commonly sized per engineering standards shown above in order to receive loads (and restrain movement of moveable lock receptor 604 away from first fixed lock receptor 602 and second fixed lock receptor) from moveable lock receptor 604 when lock 102 is in locked 536 position (similar to current latch system 100 shown in FIG. 4 in a latched and locked 536 position), moveable translation guide 618 must meet the loading requirements required of moveable bushing 126 described above, but also be configured of a size, a shape, and a material sufficient to provide stability and guidance that resist the skewing effects, of forces from the moveable lock receptor 604, on lock 102 as it translates into contact with moveable translation guide 618 fixed to moveable lock receptor 604 and translates through moveable lock receptor 604.

Moveable translation guide 618 may be made from a copper-nickel-tin alloy. Moveable translation guide 618 may be fit to remain securely within first fixed lock receptor 602 with lock 102 in translation and in any position between and including locked 536 (similar to current latch system 100 shown in FIG. 4) or unlocked 538 (as shown in FIG. 6). Moveable translation guide 618 may be shrunk fit into moveable lock receptor 604. Moveable translation guide 618 may be frozen in liquid nitrogen to be shrunk before being pressed into moveable lock receptor 604 and fit into position via expansion upon warming.

Second fixed lock receptor 606 may be fixed to the structure holding first fixed lock receptor 602 and be configured to receive lock 102, to allow lock 102 to translate through second fixed lock receptor 606, and to steady lock 102 within second fixed lock receptor 606 when latch system 600 is in locked 536 position. Second fixed lock receptor 606 may have second opening 127 130 sized to allow translation of lock 102 through second opening 127. Second translation guide 618 may be located within second fixed opening.

Unlike, second bushing 128 that is commonly sized per engineering standards listed above in order to receive loads (and restrain movement of moveable lock receptor 604 away from first fixed lock receptor 602 and second fixed lock receptor 619) from second fixed lock receptor 606 when lock 102 is in locked 536 position, second translation guide 618 must meet the loading requirements required of second bushing 128 described above, but also be configured of a size, a shape, and a material sufficient to provide stability and guidance that resist the skewing effects, of forces from the moveable lock receptor 604, on lock 102 as it translates into contact with second translation guide 618 fixed to second fixed lock receptor 619 and translates through second fixed lock receptor 619.

Second translation guide 618 may be made from a copper-nickel-tin alloy. Second translation guide 618 may be fit to remain securely within first fixed lock receptor 602 with lock 102 in translation and in any position between and including locked 536 (similar to locked 536 current latch system 100 in FIG. 4) or unlocked 538 (as shown in FIG. 6). Second translation guide 618 may be shrunk fit into moveable lock receptor 604. Second translation guide 618 may be frozen in liquid nitrogen to be shrunk before being pressed into second fixed lock receptor 619 and fit into position via expansion upon warming.

Turning now to FIG. 7, an illustration of a cross-sectional view of a latch system 600 is depicted, in accordance with an illustrative embodiment. More specifically, latch system 600 is shown as lock 102 has moved left from the unlocked 538 position of FIG. 6. Because moveable central axis 124 is not aligned with first central axis 121, chamfered corner 202 of lock 102 impacts moveable translation guide 618 at point 620. As in FIG. 2, lock 102 must generate force 206 to overcome force 214 from moveable lock receptor 604. However, unlike current latch system 100 of FIG. 2, Kamiscio guide 610 provides counterbalancing forces 702 that create a moment 704, about head 132 of actuator 104, on lock 102 that counteracts moment 216 generated by force 214 about head 132 of actuator 104 within interior chamber 114. Kamiscio guide 610 exerts forces 702 on exterior of lock 102. Forces 702 create moment 704 about head 132 of actuator 104 and counteract force 214, such that Kamiscio guide 610 inhibits lock central axis 118 from skewing away from actuator central axis 116, first central axis 121, and second central axis 534.

Thereby, Kamiscio guide 610 provides the technical benefit of inhibiting, from wear, lock 102 in latching system comprising: gland 106 surrounding actuator 104 translating the lock 102 through: first fixed lock receptor 602 comprising first opening 524, and moveable lock receptor 604 comprising moveable opening. Likewise, Kamiscio guide 610 provides the technical benefit of inhibiting wear of gland 106 around actuator 104 in lock 102 translating through: first fixed lock receptor 602, and moveable lock receptor 604 in latched position, in latching system.

Turning now to FIG. 8, an illustration of a cross-sectional view of a latch system 600 is depicted with a lock 102 approaching a locked 536 position, in accordance with an illustrative embodiment. FIG. 8 may also be considered an illustration of lock 102 just being withdrawn from a fully locked 536 position (similar to locked 536 position shown for current latch system 100 in FIG. 4). Lock 102 enters second fixed lock receptor 606 after translating through moveable lock receptor 604. Clearance 622 between outer diameter 612 of lock 102 and inner diameter 616 of second translation guide 618 may be less that clearance 622 between outer diameter 612 of lock 102 and inner diameter 616 of first translation/Kamiscio guide 610. Depending upon a vector for force 214 exerted by moveable lock receptor 604 on lock 102 as lock 102 approaches second fixed lock receptor 619, lock 102 may contact second translation guide 618. In the non-limiting embodiment illustrated, lock 102 may contact corner 802 of second translation guide 618 804. Contact with second translation guide 618 may put force 806 on lock 102 and generate moment 808 about head 132 of actuator 104 within lock 102. Kamiscio guide 610 may apply forces 810 on lock 102 about head 132 of actuator 104 that generate moment 812 that maintains lock central axis 118 substantially aligned with actuator central axis 116 and first central axis 121.

In other words as lock 102 approaches second fixed lock receptor 606, force 814 may shift lock central axis 118 off of substantial alignment with actuator central axis 116 and first central axis 121 such that lock 102 does not translate into second fixed lock receptor 619 without contacting a portion of second translation guide 618 at, without limitation, corner 802. Forces acting on moveable lock receptor 604 may generate force 814 from moveable lock receptor 604 onto lock 102. lock 102 contacting corner 802 may apply force 806 that attempts to skew lock central axis 118 out of alignment with actuator central axis 116 and first central axis 121, however Kamiscio guide 610 resists such skewing and maintains lock central axis 118 in substantial alignment with actuator central axis 116 and first central axis 121 such that lock 102 translates through second fixed lock receptor 606.

Thus, described above is an embodiment of a manufacture configured to inhibit, from wear, a gland 106 around an actuator 104 in a latch system 600 that comprises: a lock 102 configured to translate through: the manufacture fit within a first opening 524 123 in a first fixed lock receptor 602 of the latch system 600; and an opening in a moveable lock receptor 604. The manufacture may also include a first translation guide 610 and the lock 102 comprises a interior chamber 114 configured to hold an actuator fluid and the actuator 104. The manufacture may also include a ratio, between a length of the first translation guide 610 to a diameter of the lock 102, that exceeds 0.500. The manufacture may also include a ratio, between a length of the first translation guide 610 to a stroke distance 624 of the lock 102, that exceeds 0.559. The manufacture may also include the first translation guide 610 configured to prevent a gap that allows leakage, past the gland 106, of the actuator fluid from the lock 102.

Additionally, the manufacture may also include the first translation guide 610 comprises a copper-nickel-tin alloy shrunk-fit into the first opening 524. The manufacture may also include: the actuator 104 comprising an actuator central axis 116; the lock 102 comprising a lock 102 central axis; the first opening 524 123 comprising a first central axis 121; and the first translation guide 610 configured to hold the actuator central axis 116 and the lock central axis 118 substantially aligned with the first central axis 121. The manufacture may also include the latch system 600 comprising: a second fixed lock receptor 619 that comprises a second opening 127, 130 that comprises a second central axis 534; a moveable lock receptor 604, that comprises an opening that comprises a central axis, the moveable lock receptor 604 configured to rotate into a latched position located between the first fixed lock receptor 602 and the second fixed lock receptor 619; the first translation guide 610 configured to hold the actuator central axis 116 and the lock central axis 118 substantially aligned with: the central axis of the opening in the moveable lock receptor 604 in a latched position and the first central axis 121.

Additionally, the manufacture may also include the first translation guide 610 configured to inhibit the lock central axis 118 from a skew away from an alignment from the first central axis 121. The manufacture may also include the first translation guide 610 configured to inhibit from wear, responsive to an inhibition of the lock central axis 118 from a skew away from an alignment from the first central axis 121, the lock 102. The manufacture may also include the first translation guide 610 configured to inhibit, responsive to an inhibition of the lock central axis 118 from a skew away from an alignment from the first central axis 121, from wear, the first translation guide 610; a translation guide fit in the opening of the moveable lock receptor 604; and a second translation guide 618 fit in the second opening 127.

With Reference now to FIG. 9A, a perspective view of a folding aircraft wing with a latch system 600 is depicted in accordance with an illustrative embodiment. Specifically, a left half of aircraft 900 is shown with wing tip 902 of wing 904 in a folded up position. Without limitation, aircraft may be an embodiment representing article 500 of a size larger than latch system 600 as described above at least for FIGS. 5-8. Thus, without limitation wing tip and wing may be embodiments of first part 502 and second part 504 respectively of aircraft representing article 500 as described above at least for FIGS. 5-8.

With Reference now to FIG. 9B, a perspective view of a folding aircraft wing tip with a latch system 600 is depicted in accordance with an illustrative embodiment. In this embodiment, four movable lock 102 receptors 916-922 are a part of latch system 600 906 for latching wing tip to wing, and are shown exposed with wing tip in unlatched 542 and folded up position.

FIG. 9C is an illustration of a cross-sectional view of a latch system 600 in a wingtip in a latched and locked 536 condition, in accordance with an illustrative embodiment. Contrary to FIG. 9B, which shows wingtip in an unlatched 542 and unlocked 538 folded up position, in the cross-sectional view of FIG. 9C, wingtip has been moved down in-line with wing, and moveable lock receptors 916-918 are shown locked 536 into latched positions as described above for FIGS. 5-8.

In this embodiment, latch system 600/906 is shown with four latches 908-914 within wing 904. Each lock 102 receptor may be of a different size and shape from the others, but each may be considered as being represented by latch system 600/906 as described above by FIGS. 5-8. Each of latches 908-914 may be considered an embodiment of latch system 600/506 as shown in FIG. 5, in latched 540 and locked 536 position as described for FIG. 5 above. Accordingly, each of latches 908-914 may be considered as showing its respective moveable lock receptors 916-922 as being located in slot 516 between first fixed lock receptor 602 and second fixed lock receptor 606/514 as described for FIG. 5 above.

Without limitation, although FIGS. 5-8 show only a single moveable lock receptor 604 that moves into place between first fixed lock receptor 602 and second fixed lock receptor 606, one of ordinary skill in the art appreciates that additional moveable or fixed lock 102 receptors may be added. In all cases, descriptions of first fixed lock receptor 602 apply as the lock 102 receptor that retains actuator 104 and lock 102 when lock 102 is in unlocked 538 position retracted from engagement with all other lock receptors.

Figure 10:
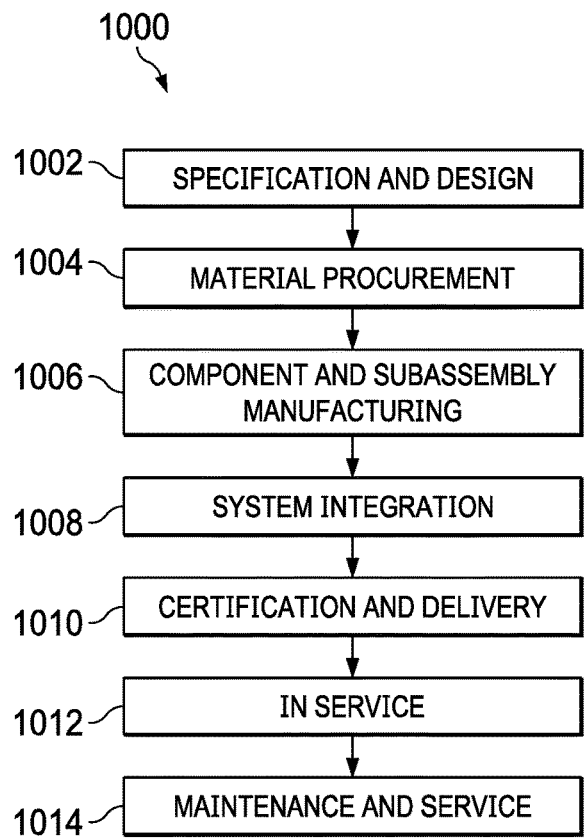
FIG. 10 is an illustration of a block diagram of an aircraft manufacturing and service method in accordance with an illustrative embodiment.

With Reference now to FIG. 10, an illustration of a block diagram of an aircraft manufacturing and service method is depicted in accordance with an illustrative embodiment. During pre-production, aircraft manufacturing and service method 1000 may include specification and design 1002 of aircraft 1100 in FIG. 11 and material procurement 1004. Aircraft 1100 in FIG. 11 may be an example of aircraft 900 shown in FIG. 9. Latch system as well as processes related thereto may be included as a part of manufacturing and service method 1000.

Figure 11:
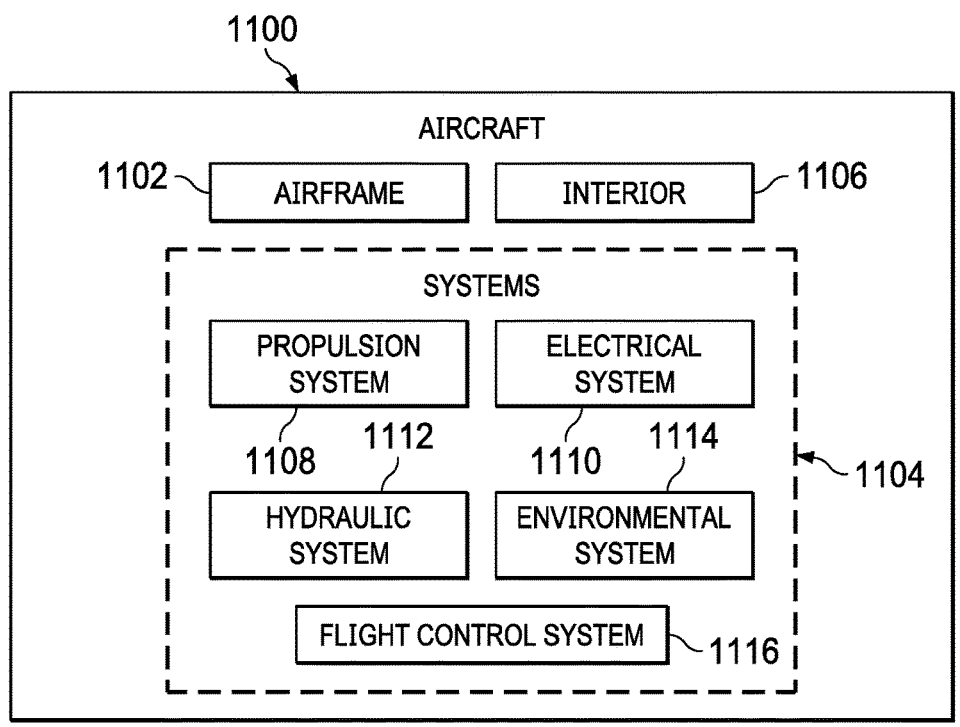
FIG. 11 is an illustration of a block diagram of an aircraft in which an illustrative embodiment may be implemented.

During production, component and subassembly manufacturing 1006 and system integration 1008 of aircraft 1100 in FIG. 11 takes place. Thereafter, aircraft 1100 in FIG. 11 may go through certification and delivery 1010 in order to be placed in service 1012. While in service 1012 by a customer, aircraft 1100 in FIG. 11 is scheduled for routine maintenance and service 1014, which may include modification, reconfiguration, refurbishment, and other maintenance or service. Modification, reconfiguration, refurbishment, and other maintenance or service may include retrofit of a current latch system 100 by removing first fixed bushing as described for FIGS. 1-4 and replacing it with first translation guide as described in FIGS. 5-8. Hence, the technical benefits of the novel embodiments and processes described herein may be obtained not only in original production, but also through application of the novel embodiments and processes described herein to current equipment via a retrofit and/or reconfiguration as a part of a maintenance service.

Each of the processes of aircraft manufacturing and service method 1000 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 11, an illustration of a block diagram of an aircraft is depicted in which an illustrative embodiment may be implemented. In this example, aircraft 1100 is produced by aircraft manufacturing and service method 1000 in FIG. 10 and may include airframe 1102 with plurality of systems 1104 and interior 1106. Examples of systems 1104 include one or more of propulsion system 1108, electrical system 1110, hydraulic system 1112, environmental system 1114, and flight control system 1116. Aircraft 1100 may be considered an embodiment of article 500 as described in FIGS. 5-8 and aircraft 900 in FIG. 9. Without limitation, latch system 600 described FIGS. 5-8 and shown as latches 906 in FIG. 9 may be considered as part of electrical system 1110, hydraulic system 1112, and flight control system 1116. Any number of other systems may be included in aircraft 1100. Although an aerospace example is shown, different illustrative embodiments may be applied to other industries, such as without limitation the automotive industry.

Apparatuses and methods embodied herein may be a result of at least one of the stages of aircraft manufacturing and service method 1000 in FIG. 10. In one illustrative example, components or subassemblies produced in component and subassembly manufacturing 1006 in FIG. 10 may be fabricated or manufactured in a manner similar to components or subassemblies produced while aircraft 1100 is in service 1012 in FIG. 10.

As yet another example, one or more apparatus embodiments, method embodiments, or a combination thereof may be utilized during production stages, such as component and subassembly manufacturing 1006 and system integration 1008 in FIG. 10. One or more apparatus embodiments, method embodiments, or a combination thereof may be utilized while aircraft 1100 is in service 1012, during maintenance and service 1014 in FIG. 10, or both.

For example, latch system 506 can be produced in component and subassembly manufacturing 1006, such as assembling fuselage sections for airframe 1102. Additionally, latch system can be joined to other systems during system integration 1008. For example, inspection, drilling, fastener installation, or other operations may be performed as at least electrical system 1110 and hydraulic system 1112 are integrated with latch system as a part of flight control system 1116 during system integration 1008.

The use of a number of the different illustrative embodiments presented herein may substantially expedite the assembly of aircraft 1100, reduce the cost of aircraft 1100, or both expedite the assembly of aircraft 1100 and reduce the cost of aircraft 1100. Additionally, as described above, latch system inhibits friction, wear, leakage, and service requirements of components of latch system compared to current latch system 100. Hence, latch system thereby increases reliability and reduces needed maintenance servicing and reduces interruptions to operation of aircraft 1100 while in service. Therefore, a number of the different illustrative embodiments presented herein reduce the operating cost and increase the reliability and operating availability and efficiency of aircraft 1100 relative to aircraft using current latch system 100.

Figure 12:
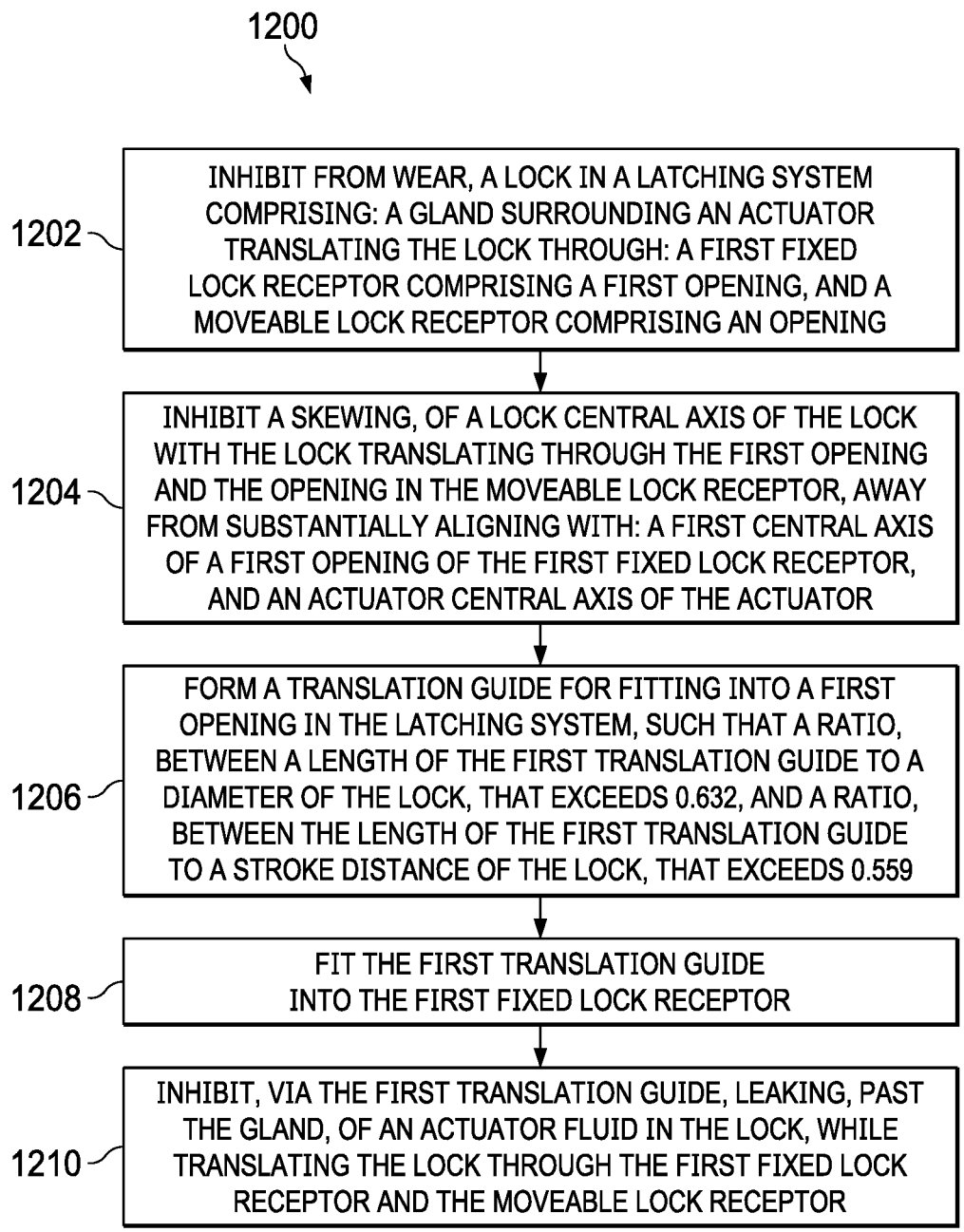
FIG. 12 is an illustration of a flowchart of a process for inhibiting, from wear, a lock in a latching system comprising: a gland surrounding an actuator translating the lock through: a first fixed lock receptor comprising a first opening, and a moveable lock receptor comprising an opening in accordance with an illustrative embodiment.

Turning next to FIG. 12, an illustration of a flowchart of a process for inhibiting, from wear, a lock 102 in a latching system comprising: a gland 106 surrounding an actuator 104 translating the lock 102 through: a first fixed lock 102 receptor comprising a first opening, and a moveable lock 102 receptor comprising an opening, is depicted in accordance with an illustrative embodiment. Without limitation, the process illustrated in FIG. 12 can be implemented in manufacturing environment 1006 in FIG. 10.

Process 1200 may include operation 1202 inhibiting, from wear, a lock 102 in a latching system comprising: a gland 106 surrounding an actuator 104 translating the lock 102 through: a first fixed lock 102 receptor comprising a first opening, and a moveable lock 102 receptor comprising an opening. Process 1200 may include operation 1204 inhibiting a skewing, of lock central axis 118 of lock 102 with lock 102 translating through first opening 123 and moveable opening 122 in moveable lock 102 receptor, away from substantially aligning with: first central axis 121 of first opening 123 of first fixed lock 102 receptor, and actuator central axis 116 of actuator 104.

Process 1200 may also include operation 1206 of forming translation guide for fitting into first opening 123in latching system, such that a ratio, between length of first translation guide to diameter of lock 102, that exceeds 0.500, and a ratio, between length of first translation guide to stroke distance 624 of lock 102, exceeds 0.559. Without limitation, the first translation guide may be formed comprising a copper-nickel-tin alloy.

Process 1200 may also include operation 1208 of fitting first translation guide into first fixed lock 102 receptor. Without limitation, fitting first translation guide may include shrink-fitting first translation guide into first opening. Additionally, process 1200 may include operation 1210 of inhibiting, via first translation guide, leaking, past gland 106, of an actuator fluid in lock 102, while translating lock 102 through at least first fixed lock 102 receptor and moveable lock 102 receptor.

Thus, described above is a process for inhibiting, from wear, a lock 102 in a latching system comprising: a gland 106 surrounding an actuator 104 translating the lock 102 through: a first fixed lock 102 receptor comprising a first opening, and a moveable lock 102 receptor comprising an opening, the process comprising: inhibiting a skewing, of a lock central axis 118 of the lock 102 with the lock 102 translating through the first opening 123 and the opening in the moveable lock 102 receptor, away from substantially aligning with: a first central axis 121 of a first opening 123of the first fixed lock 102 receptor, and an actuator central axis 116 of the actuator 104, via fitting a first translation guide into the first fixed lock 102 receptor. The process may also include the first translation guide inhibiting leaking, past the gland 106, of an actuator fluid in the lock 102, while translating the lock 102 through the first fixed lock 102 receptor and the moveable lock 102 receptor.

Additionally, the process may also include a ratio, between a length of the first translation guide to a diameter of the lock 102, that exceeds 0.500. The process may also include a ratio, between a length of the first translation guide to a stroke distance 624 of the lock 102, that exceeds 0.559.

The process may also include the first translation guide comprising a copper-nickel-tin alloy; and shrink-fitting the first translation guide into the first opening.

Figure 13:
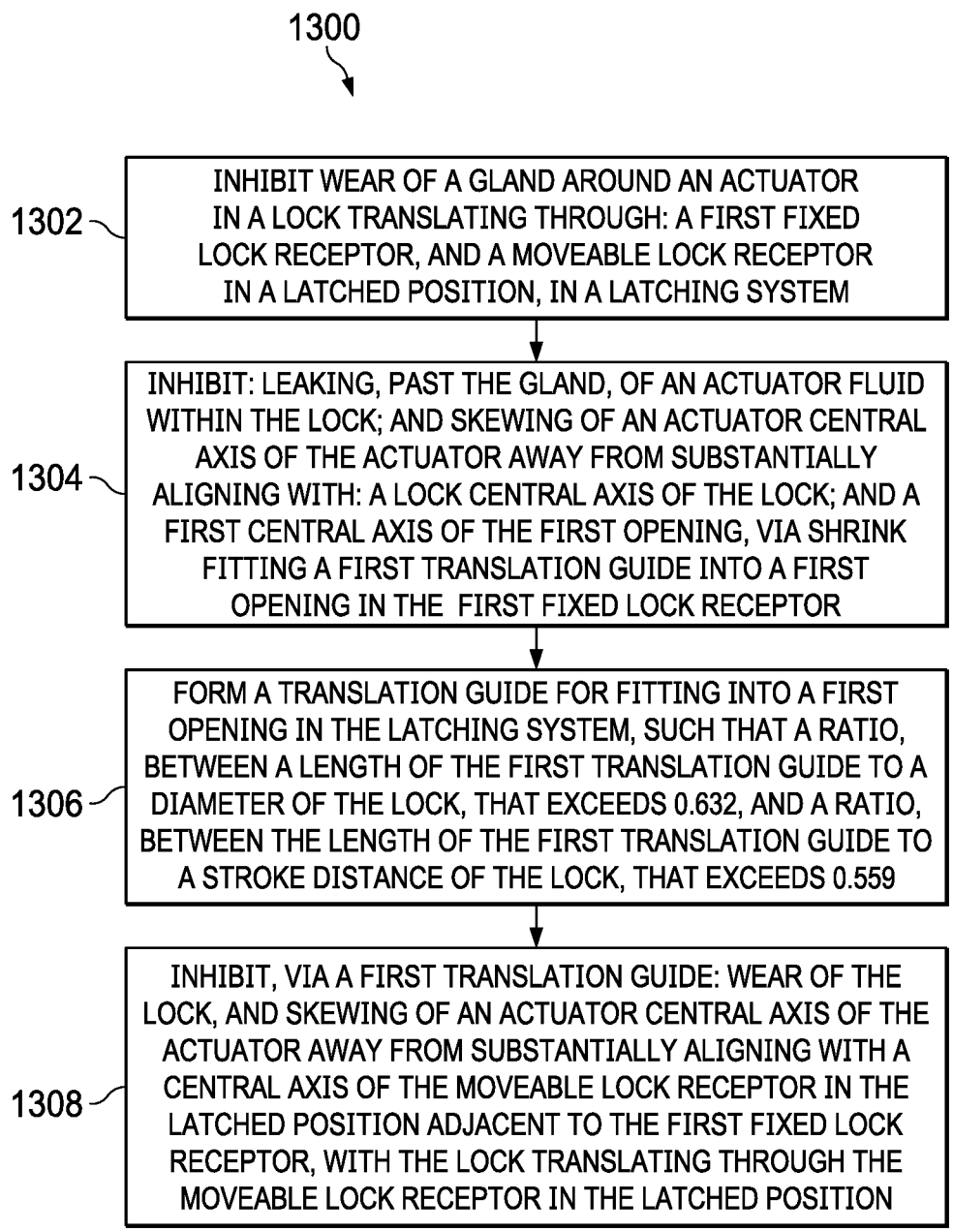
FIG. 13 is an illustration of a flowchart of a process for inhibiting wear of a gland around an actuator in a lock translating through: a first fixed lock receptor, and a moveable lock receptor in a latched position, in a latching system in accordance with an illustrative embodiment.

Turning to FIG. 13, an illustration of a flowchart of a process for inhibiting wear of a gland 106 around an actuator 104 in a lock 102 translating through: a first fixed lock 102 receptor, and a moveable lock 102 receptor in a latched position, in a latching system, is depicted in accordance with an illustrative embodiment.

The process illustrated in FIG. 13 can be implemented in operation 1302 inhibiting wear of gland 106 around actuator 104 in lock 102 translating through: first fixed lock 102 receptor, and moveable lock 102 receptor in latched position, in latch system.

Process 1300 may also include operation 1304 inhibiting: leaking, past gland 106, of actuator fluid within the lock 102; and skewing of actuator central axis 116 of actuator 104 away from substantially aligning with: lock central axis 118 of the lock 102; and first central axis 121 of first opening, via shrink-fitting first translation guide into first opening 123 in first fixed lock 102 receptor. Process 1300 may also include operation 1306 forming translation guide for fitting into first opening 123 in latching system, such that a ratio, between length of first translation guide to a diameter of the lock 102, exceeds 0.500:1, and a ratio, between the length of the first translation guide to a stroke distance 624 of the lock 102, exceeds 0.559:1.

Process 1300 may also include operation 1308 inhibiting, via first translation guide: wear of lock 102, and skewing of actuator central axis 116 of actuator 104 away from substantially aligning with central axis of moveable lock 102 receptor in latched position adjacent to first fixed lock 102 receptor, with lock 102 translating through moveable lock 102 receptor in latched position. Hence, the manufacture and process described above teaches away from and overcomes the technical difficulties of current latch system 100s at least by inhibiting wear of gland 106 around actuator 104 in lock 102 translating through: first fixed lock 102 receptor, and moveable lock 102 receptor in latched position, in latch system.

Thus, described above is a process for inhibiting wear of a gland 106 around an actuator 104 in a lock 102 translating through: a first fixed lock 102 receptor, and a moveable lock 102 receptor in a latched position, in a latching system, the process comprising inhibiting: leaking, past the gland 106, of an actuator fluid within the lock 102; and skewing of an actuator central axis 116 of the actuator 104 away from substantially aligning with: a lock central axis 118 of the lock 102; and a first central axis 121 of the first opening, via shrink-fitting a first translation guide into a first opening 123 in the first fixed lock 102 receptor. The process may include inhibiting, via the first translation guide: wear of the lock 102, and skewing of an actuator central axis 116 of the actuator 104 away from substantially aligning with a central axis of the moveable lock 102 receptor in the latched position adjacent to the first fixed lock 102 receptor, with the lock 102 translating through the moveable lock 102 receptor in the latched position.

Additionally, the process may include a ratio, between a length of the first translation guide to a diameter of the lock 102, that exceeds 0.500. The process may also include a ratio, between a length of the first translation guide to a stroke distance 624 of the lock 102, that exceeds 0.559.

Figure 14:
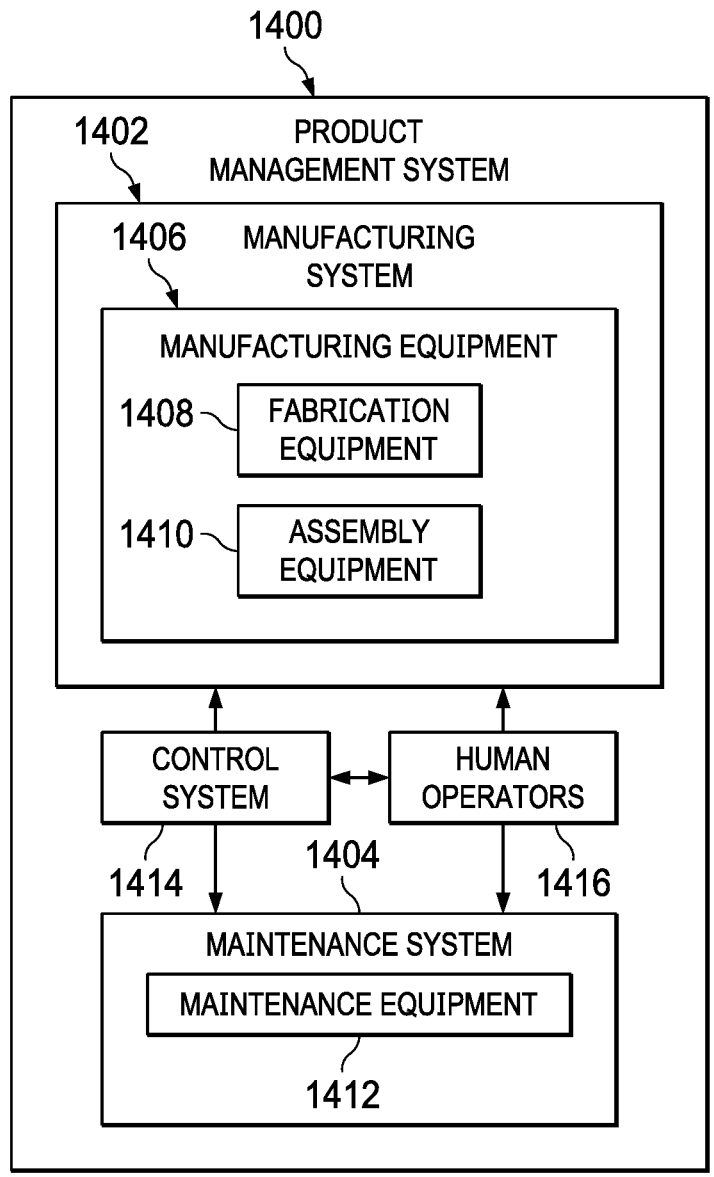
FIG. 14 is an illustration of a block diagram of a product management system in accordance with an illustrative embodiment.

Turning now to FIG. 14, an illustration of a block diagram of a product management system is depicted in accordance with an illustrative embodiment. Product management system 1400 is a physical hardware system. In this illustrative example, product management system 1400 may include at least one of manufacturing system 1402 or maintenance system 1404.

Manufacturing system 1402 is configured to manufacture products, such as aircraft 1100 in FIG. 11. As depicted, manufacturing system 1402 includes manufacturing equipment 1406. Manufacturing equipment 1406 includes at least one of fabrication equipment 1408 or assembly equipment 1410.

Fabrication equipment 1408 is equipment that may be used to fabricate components for parts used to form aircraft 1100 in FIG. 11. For example, fabrication equipment 1408 may include machines and tools. These machines and tools may be at least one of a drill, a hydraulic press, a furnace, a mold, a composite tape laying machine, a vacuum system, a lathe, or other suitable types of equipment. Fabrication equipment 1408 may be used to fabricate at least one of metal parts, composite parts, semiconductors, circuits, fasteners, ribs, skin panels, spars, antennas, or other suitable types of parts.

Assembly equipment 1410 is equipment used to assemble parts to form aircraft 1100 in FIG. 11. In particular, assembly equipment 1410 may be used to assemble components and parts to form aircraft 1100 in FIG. 17. Assembly equipment 1410 also may include machines and tools. Without limitation, these machines and tools may be at least one of a robotic arm, a crawler, a faster installation system, a rail-based drilling system, or a robot. Assembly equipment 1410 may be used to assemble parts such as seats, horizontal stabilizers, wings, engines, engine housings, landing gear systems, and other parts for aircraft 1100 in FIG. 11. For example, assembly equipment 1410 may include flexible track system 115 and crawler robot 164 in vacuum track manufacturing system 106 in FIG. 1.

In this illustrative example, maintenance system 1404 includes maintenance equipment 1412. Maintenance equipment 1412 may include any equipment needed to perform maintenance on aircraft 1100 in FIG. 11. Maintenance equipment 1412 may include tools for performing different operations on parts on aircraft 1100 in FIG. 11. These operations may include at least one of disassembling parts, refurbishing parts, inspecting parts, reworking parts, manufacturing replacement parts, or other operations for performing maintenance on aircraft 1100 in FIG. 11. These operations may be for routine maintenance, inspections, upgrades, refurbishment, or other types of maintenance operations.

In the illustrative example, maintenance equipment 1412 may include ultrasonic inspection devices, x-ray imaging systems, vision systems, drills, crawlers, and other suitable types of equipment. In some cases, maintenance equipment 1412 may include fabrication equipment 1408, assembly equipment 1410, or both to produce and assemble parts that may be needed for maintenance.

Product management system 1400 also includes control system 1414. Control system 1414 is a hardware system and may also include software or other types of components. Control system 1414 is configured to control the operation of at least one of manufacturing system 1402 or maintenance system 1404. In particular, control system 1414 may control the operation of at least one of fabrication equipment 1408, assembly equipment 1410, or maintenance equipment 1412.

The hardware in control system 1414 may be using hardware that may include computers, circuits, networks, and other types of equipment. The control may take the form of direct control of manufacturing equipment 1406. For example, robots, computer-controlled machines, and other equipment may be controlled by control system 1414. In other illustrative examples, control system 1414 may manage operations performed by human operators 1416 in manufacturing or performing maintenance on aircraft 1100. For example, control system 1414 may assign tasks, provide instructions, display models, or perform other operations to manage operations performed by human operators 1416. In these illustrative examples, vacuum track manufacturing system 106 can be controlled by control system 1414 to manage at least one of the manufacturing or maintenance of aircraft 1100 in FIG. 11. As another example, control system 1414 may include a controller, which operates to control the manufacturing system 1806 used to manufacture latch system 600 and components therein such as first translation guide 526.

In the different illustrative examples, human operators 1416 may operate or interact with at least one of manufacturing equipment 1406, maintenance equipment 1412, or control system 1414. This interaction may be performed to manufacture aircraft 1100 in FIG. 11.

Of course, product management system 1400 may be configured to manage other products other than aircraft 1100 in FIG. 11. Although product management system 1400 has been described with respect to manufacturing in the aerospace industry, product management system 1400 may be configured to manage products for other industries. For example, product management system 1400 can be configured to manufacture products for the automotive industry as well as any other suitable industries.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A manufacture configured to inhibit, from wear, a gland around an actuator in a latch system that comprises:
    a first translation guide; and
    a lock that comprises:
        an outer diameter;
        an interior chamber configured to hold an actuator fluid and the actuator;
        a ratio, between a length of the first translation guide to the outer diameter of the lock, that exceeds 0.500, wherein the lock is configured to translate through:
            the manufacture fitted within a first opening in a first fixed lock receptor of the latch system; and
            an opening in a moveable lock receptor.

2. The manufacture of claim 1, further comprising the first translation guide configured to prevent a gap that allows leakage, past the gland, of the actuator fluid from the lock.

3. The manufacture of claim 1, further comprising a ratio, between the length of the first translation guide to a stroke distance of the lock, that exceeds 0.559.

4. The manufacture of claim 3, further comprising:
    the outer diameter of the lock comprising a dimension of 2.48 inches;
    the length of the first translation guide being greater than 1.24 inches; and
    the stroke distance of the lock comprising a dimension of less than 0.878 inches.

5. The manufacture of claim 1, wherein the first translation guide comprises a copper-nickel-tin alloy shrunk-fit into the first opening.

6. The manufacture of claim 1, further comprising:
    the actuator comprising an actuator central axis;
    the lock comprising a lock central axis;
    the first opening comprising a first central axis; and
    the first translation guide configured to hold the actuator central axis and the lock central axis substantially aligned with the first central axis.

7. The manufacture of claim 6, further comprising the latch system comprising:
    a second lock receptor that comprises a second opening that comprises a second central axis;
    the moveable lock receptor, that comprises a moveable opening that comprises a central axis, the moveable lock receptor configured to rotate into a latched position located between the first fixed lock receptor and the second lock receptor; and
    the first translation guide configured to hold the actuator central axis and the lock central axis substantially aligned with: the central axis of the opening in the moveable lock receptor in the latched position and the first central axis.

8. The manufacture of claim 6, further comprising the first translation guide configured to inhibit the lock central axis from a skew away from an alignment from the first central axis.

9. The manufacture of claim 6, further comprising the first translation guide configured to inhibit from wear, responsive to an inhibition of the lock central axis from a skew away from an alignment from the first central axis, the lock.

10. The manufacture of claim 7, further comprising the first translation guide configured to inhibit, responsive to an inhibition of the lock central axis from a skew away from an alignment from the first central axis, from wear:
    the first translation guide;
    a translation guide fit in the opening of the moveable lock receptor; and
    a second translation guide fit in the second opening.

11. A process for inhibiting, from wear, a lock in a latching system comprising a gland surrounding an actuator translating the lock through:
    a first fixed lock receptor comprising a first opening; and
    a moveable lock receptor comprising an opening, the process comprising: inhibiting a skewing, of a lock central axis of the lock with the lock translating through the first opening and the opening in the moveable lock receptor, away from substantially aligning with:
        a first central axis of the first opening of the first fixed lock receptor, and
        an actuator central axis of the actuator, via fitting a first translation guide into the first fixed lock receptor, wherein a ratio between a length of the first translation guide to a diameter of the lock exceeds 0.500.

12. The process of claim 11, further comprising the first translation guide inhibiting leaking, past the gland, of an actuator fluid in the lock, while translating the lock through the first fixed lock receptor and the moveable lock receptor.

13. The process of claim 11, further comprising a ratio, between the length of the first translation guide to a stroke distance of the lock, that exceeds 0.559.

14. The process of claim 11, further comprising:
    the first translation guide comprising a copper-nickel-tin alloy; and
    shrink-fitting the first translation guide into the first opening.

15. The process of claim 11, further comprising:
    the lock comprising an outer diameter comprising a dimension of 2.48 inches;
    the first translation guide comprising a length greater than 1.24 inches; and
    a stroke distance of the lock comprising a dimension of less than 0.878 inches.

16. A process for inhibiting wear of a gland around an actuator in a lock translating through:
    a first fixed lock receptor; and
    a moveable lock receptor in a latched position, in a latching system, the process comprising inhibiting:
        leaking, past the gland, of an actuator fluid within the lock; and
        skewing of an actuator central axis of the actuator away from substantially aligning with:
            a lock central axis of the lock; and
            a first central axis of a first opening, via shrink-fitting a first translation guide into a first opening in the first fixed lock receptor, wherein a ratio between a length of the first translation guide to a diameter of the lock exceeds 0.500.

17. The process of claim 16, further comprising:
    inhibiting, via the first translation guide: wear of the lock, and skewing of the actuator central axis of the actuator away from substantially aligning with a central axis of the moveable lock receptor in the latched position adjacent to the first fixed lock receptor, with the lock translating through the moveable lock receptor in the latched position.

18. The process of claim 16, further comprising a ratio, between the length of the first translation guide to a stroke distance of the lock, that exceeds 0.559.

19. A manufacturing system configured to inhibit wear in components of a latching system that comprises:
- a lock configured to translate a stroke distance through a first translation guide in a first lock receptor that comprises a first opening and a moveable lock receptor that comprises a second opening, wherein the lock comprises:
  - an outer diameter;
  - an interior chamber configured to hold an actuator and an actuator fluid;
  - a ratio, between a length of the first translation guide to the outer diameter of the lock, that exceeds 0.500.

20. The manufacturing system of claim 19, further comprising a machine configured to produce the first translation guide, configured to shrink-fit within the first opening, such that the first translation guide comprises a length of at least 1.24 inches, and the outer diameter of the lock comprises a dimension of 2.48 inches and the stroke distance that comprises a dimension of less than 0.878 inches.

21. A method for fabricating a portion of an aircraft comprising a manufacture configured to inhibit a wear of components of a latching system for a folding wing, the method comprising shrink-fitting a first translation guide into a first opening in a first lock receptor adjacent to a moveable lock receptor in a flight position in a folding wing system, such that the first translation guide comprises a length greater than 1.24 inches, and a lock in the latching system comprises an outer diameter comprising a dimension of 2.48 inches and a stroke distance that comprises a dimension of less than 0.878 inches.

\* \* \* \* \*